US011568069B1

(12) United States Patent
Liang et al.

(10) Patent No.: US 11,568,069 B1
(45) Date of Patent: Jan. 31, 2023

(54) DATA SECURITY PROTECTION SYSTEM

(71) Applicant: BEIJING BYTEDANCE NETWORK TECHNOLOGY CO., LTD., Beijing (CN)

(72) Inventors: Yuming Liang, Beijing (CN); Dingkun Hong, Singapore (SG); Lifeng Sang, Los Angeles, CA (US); Jingting Jin, Beijing (CN); Jianye Ye, Beijing (CN); Xingxiu Chen, Beijing (CN); Zhenyuan Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/679,886

(22) Filed: Feb. 24, 2022

(30) Foreign Application Priority Data

Oct. 27, 2021 (CN) .......................... 202111258238.0

(51) Int. Cl.
| | |
|---|---|
| *G06F 21/00* | (2013.01) |
| *G06F 21/60* | (2013.01) |
| *G06F 21/57* | (2013.01) |
| *G06F 8/60* | (2018.01) |
| *G06F 8/41* | (2018.01) |

(52) U.S. Cl.
CPC .............. *G06F 21/606* (2013.01); *G06F 8/41* (2013.01); *G06F 8/60* (2013.01); *G06F 21/577* (2013.01); *G06F 2221/033* (2013.01)

(58) Field of Classification Search
CPC . G06F 21/606; G06F 8/41; G06F 8/60; G06F 21/577; G06F 2221/033
See application file for complete search history.

(56) References Cited

U.S. PATENT DOCUMENTS

| | | | |
|---|---|---|---|
| 9,928,059 B1* | 3/2018 | Sartor | G06F 8/71 |
| 10,298,720 B1* | 5/2019 | Miller | H04L 67/01 |
| 2014/0237599 A1* | 8/2014 | Gertner | H04L 63/1425 |
| | | | 726/24 |
| 2015/0200784 A1* | 7/2015 | Jung | G06F 8/61 |
| | | | 713/176 |
| 2017/0034193 A1* | 2/2017 | Schulman | H04L 63/1416 |

* cited by examiner

*Primary Examiner* — Ghazal B Shehni

(57) ABSTRACT

According to embodiments of the present disclosure, there is provided a system, method, electronic device, storage medium and program product of security protection. The system comprises: a security computing sub-system, configured to manage security of developed code to compile the developed code into an installation file corresponding to a target application and a service program for supporting the target application; a data exchange sub-system, configured to manage data communication of the target application or service program with RoW (rest of World); and a security sandbox sub-system, configured to manage traffic data associated with the target application. In this way, the embodiments of the present disclosure can guarantee the security and compliance of data related to the target application.

20 Claims, 16 Drawing Sheets

DATA SECURITY PROTECTION SYSTEM

CROSS-REFERENCE TO RELATED APPLICATION

This application is based on and claims the priority to the Chinese patent application No. 202111258238.0, filed on Oct. 27, 2021, the disclosure of which is incorporated into the present application by reference in its entirety.

FIELD

Various implementations of the present disclosure relate to the computer field, and more specifically, to a system, method, electronic device and computer storage medium of data security protection.

BACKGROUND

With the development of Internet technology, different varieties of Internet applications have become an important part of people's life. Such applications generate a huge amount of data each day, which brings about various data security issues such as data sovereignty protection. For example, some countries might prohibit specific types of user data from being sent to rest of World (RoW) servers.

For some globalized applications, such challenges are even more significant. These globalized applications may need to provide services for users in a plurality of different regions based on same technical architecture. However, these regions might have different data security constraints, for example, specific data sovereignty protection requirements, which further compounds the difficulty of data security protection.

SUMMARY

In a first aspect of the present disclosure, a data security management system is provided. The system comprises: a security computing sub-system, configured to manage security of developed code to compile the developed code into an installation file corresponding to a target application and a service program for supporting the target application; a data exchange sub-system, configured to manage data communication of the target application or service program with RoW; and a security sandbox sub-system, configured to manage traffic data associated with the target application.

In a second aspect of the present disclosure, a data security management is provided. The method comprises: managing, by a security computing sub-system, security of developed code to compile the developed code into an installation file corresponding to a target application and a service program for supporting the target application; managing, by a data exchange sub-system, data communication of the target application or service program with the RoW; and managing, by a security sandbox sub-system, traffic data associated with the target application.

In a third aspect of the present disclosure, an electronic device is provided, comprising: a memory and a processor; wherein the memory is used to store one or more computer instructions, wherein the one or more computer instructions are executed by the processor to implement a method according to the second aspect of the present disclosure.

In a fourth aspect of the present disclosure, a computer-readable storage medium is provided, with one or more computer instructions stored thereon, wherein the one or more computer instructions are executed by a processor to implement a method according to the second aspect of the present disclosure.

In a fifth aspect of the present disclosure, a computer program product is provided, comprising one or more computer instructions, wherein the one or more computer instructions are executed by a processor to implement a method according to the second aspect of the present disclosure.

BRIEF DESCRIPTION OF THE DRAWINGS

The above and other features, advantages and aspects of the embodiments of the present disclosure will become more apparent with reference to the following detailed descriptions in conjunction with the accompanying drawings. In the drawings, the same or similar reference numerals denote the same or similar elements, wherein.

DETAILED DESCRIPTION OF EMBODIMENTS

The embodiments will be described in more detail with reference to the accompanying drawings, in which some embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art. It is to be understood that the drawings and embodiments of the present disclosure are only used for illustration, rather than limiting the protection scope of the present disclosure.

In the description of the embodiments of the present disclosure, the terms "comprise" and its variants used herein are to be read as open terms that mean "include, but is not limited to." The term "based on" is to be read as "based at least in part on". The term "one embodiment" or "the embodiment" is to be read as "at least one embodiment." The terms "first," "second" and the like may refer to different or the same objects. Other definitions, explicit and implicit, might be included below.

The basic principle and several example implementations of the present disclosure will be illustrated with reference to the accompanying drawings.

Overall Architecture of Data Security Protection System

Figure 1:
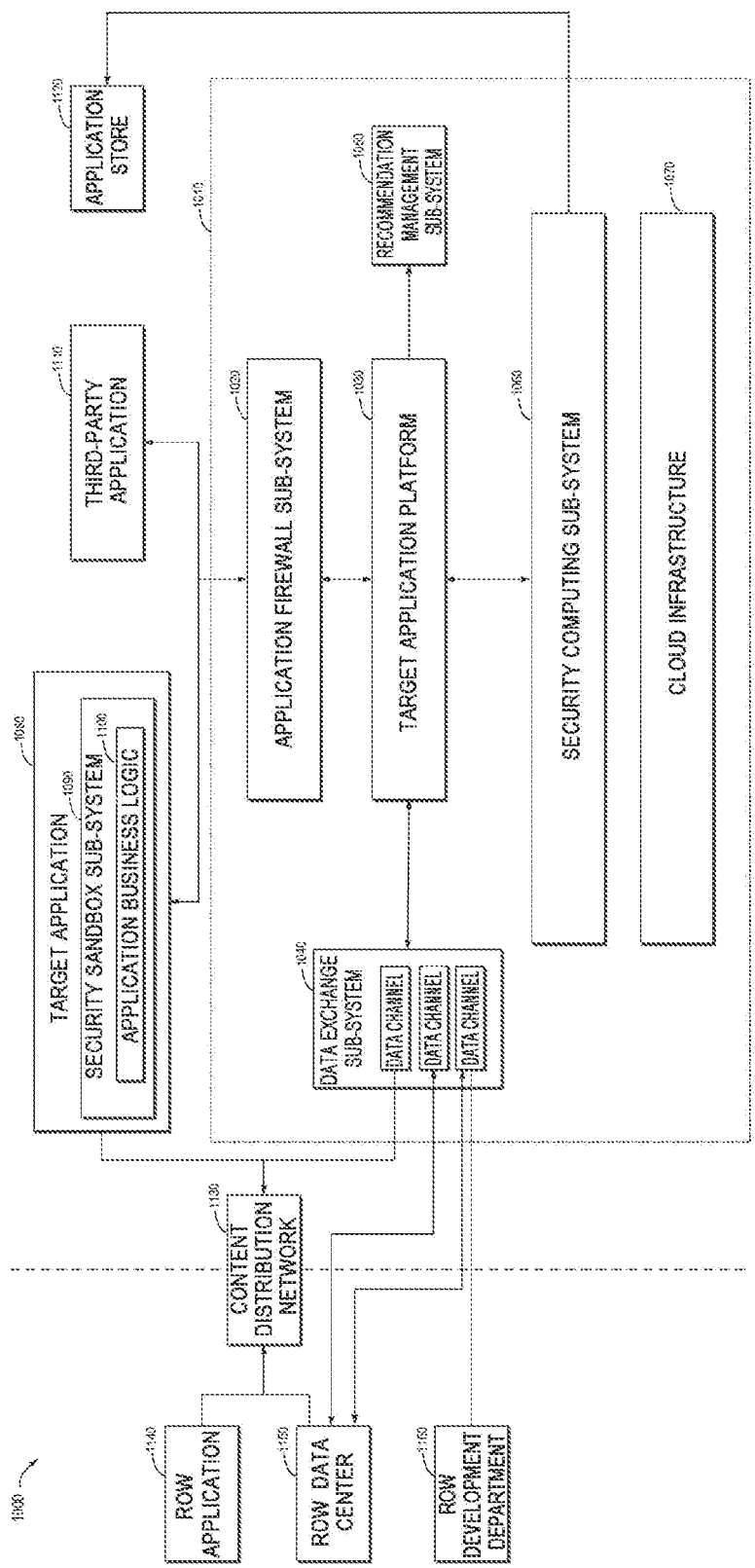
FIG. 1 shows a schematic block diagram of a data security protection system according to the embodiments of the present disclosure.

According to the embodiments of the present disclosure, a data security protection system is provided. FIG. 1 shows a schematic block diagram of a data security protection system 1000 according to the embodiments of the present disclosure. As shown in FIG. 1, the data security protection system 1000 comprises a plurality of sub-systems for protecting, from different dimensions, security of relevant data generated during using a target application by a user.

Generally speaking, to support the operation of the target application, on one hand, the user needs to operate the target application 1080, for example, through an appropriate electronic device. On the other hand, a target application platform 1030 needs to be deployed in an appropriate computing environment (e.g., cloud computing environment), to operate various types of services for supporting the normal operation of the target application 1080.

In some embodiments, the data security protection system 1000 may first guarantee the security of data generated during the operation of the target application 1080 from the perspective of the security of operating codes. As shown in FIG. 1, the data security protection system 1000 may comprise a security computing sub-system 1060, which may be used to guarantee the security of codes corresponding to the target application 1080 and guarantee the security of codes corresponding to the target application platform 1030.

A service operating file compiled by the computing sub-system 1060 may be deployed to the target application platform 1030, for example, and an installation file (e.g., apk file) of the target application compiled by the computing sub-system 1060 may be issued to an application store 1120, for example. The specific implementation of the security computing sub-system 1060 will be discussed in detail below in conjunction with FIG. 2.

In some embodiments, as shown in FIG. 1, the security computing sub-system 1060 may be based on cloud infrastructure 1070. In some embodiments, the cloud infrastructure 1070 may be provided by a trusted partner, for example. In the present disclosure, the "trusted partner" may also be referred to as trusted technology partner (TTP), which may comprise, for example, any technically trusted individual, enterprise or organization in a specific region (e.g., specific country or jurisdiction).

In some embodiments, as shown in FIG. 1, the data security protection system 1000 may comprise a trusted security environment 1010 provided by TTP. Unlike the deployment of a traditional application platform, the target application platform 1030 may be deployed in the trusted security environment 1010 to increase the security of data generated by the target application platform 1030 as well as the transparency and credibility of the operating mechanism thereof.

In some embodiments, the target application 1080 may provide users with content recommendation services through recommendation algorithms. Such content recommendation may comprise but not limited to, multimedia content recommendation, user recommendation, product recommendation, etc. Considering that more and more recommendation systems currently use machine learning to perform the recommendation function, it might be difficult to guarantee the fairness of recommendation by managing the recommendation mechanism only from the code level.

As shown in FIG. 1, the data security protection system 1000 may further comprise a recommendation management sub-system 1050, which may, for example, guarantee the fairness of the recommendation mechanism in the target application 1080 by testing the recommendation algorithm operated by the target application platform 1030. The specific implementation of the recommendation management sub-system 1050 will be described in detail below.

In some embodiments, considering that when the target application platform 1030 operates a service to support the normal operation of the target application 1080, the target application platform 1030 might need to interact with applications or data centers (also referred to as RoW applications or RoW data centers) outside the target region (e.g., a specific country or jurisdiction) where it is currently deployed.

Generally speaking, the target region usually adopts laws or regulations to constrain the communication of data generated in the present region with the RoW. Specific types of data generated in the target region might be prohibited from being transmitted RoW. In order to guarantee the compliance of the target application platform 1030 in the communication process with the RoW, the data security protection sub-system may comprise a data exchange sub-system 1040.

Similarly, the data exchange sub-system 1040 may be deployed in the trusted security environment 1010 to guarantee the transparency and credibility of its operation.

In some embodiments, as shown in FIG. 1, the data exchange sub-system 1040 may comprise a plurality of data channels for different types of data transmission. For example, multimedia data generated in the target application platform 1030 may communicate with an RoW application 1140 and/or an RoW data center 1150 through a respective data channel in the data exchange sub-system 1040 via a content distribution network 1130 provided by a third party.

As another example, for some specific internal data generated in the target application platform 1030, it may communicate with the RoW data center 1150 and an RoW development department 1160 through a respective data channel, e.g., through a direct optical cable. The specific implementation of the data exchange sub-system 1040 will be described in detail in conjunction with FIGS. 3A to 3M.

Further, to guarantee the security of outbound and inbound communication of the target application platform 1030, in some embodiments, the data security sub-system 1000 may further comprise an application firewall sub-system 1020. The application firewall sub-system 1020 may be deployed in the trusted security environment 1010, which may be used to manage the data communication from the target application 1080 to the target application platform 1030, the data communication from the target application platform 1030 to the target application 1080, and/or the data communication from the target application platform 1030 to a third-party application 110, etc.

In this way, the data security protection platform 1000 not only may guarantee the security and compliance of data communication between the target application platform 1030 and the RoW through the data exchange sub-system 1040, but also can guarantee the security and compliance of communication between the target application platform 1030 and various domestic objects (e.g., the target application 1080 or a third-party application 1110, etc.) through the application firewall sub-system 1020.

In some embodiments, regarding the target application 1080, to guarantee the compliance and credibility of its operation, the data security protection system 1000 may further comprise a security sandbox sub-system 1090 managed by the TTP, which enables different types of network communication involved in the application business logic 1100 of the target application 1080 to be protected by the security sandbox sub-system 1090. In this way, the data security protection system 1000 may prevent the target application 1080 from initiating non-compliant data communication, e.g., through backdoor programs. The detailed implementation of the security sandbox sub-system 1090 will be described in conjunction with FIGS. 4A to 4E below.

Thus, based on the data security protection system 1000 of the present disclosure, TTP can manage and monitor various aspects such as code security and data security during the entire life cycle from the development to operation of the target application, thereby guaranteeing the data security associated with the target application and also guaranteeing the compliance of its operation.

Security Computing Sub-System

Figure 2:
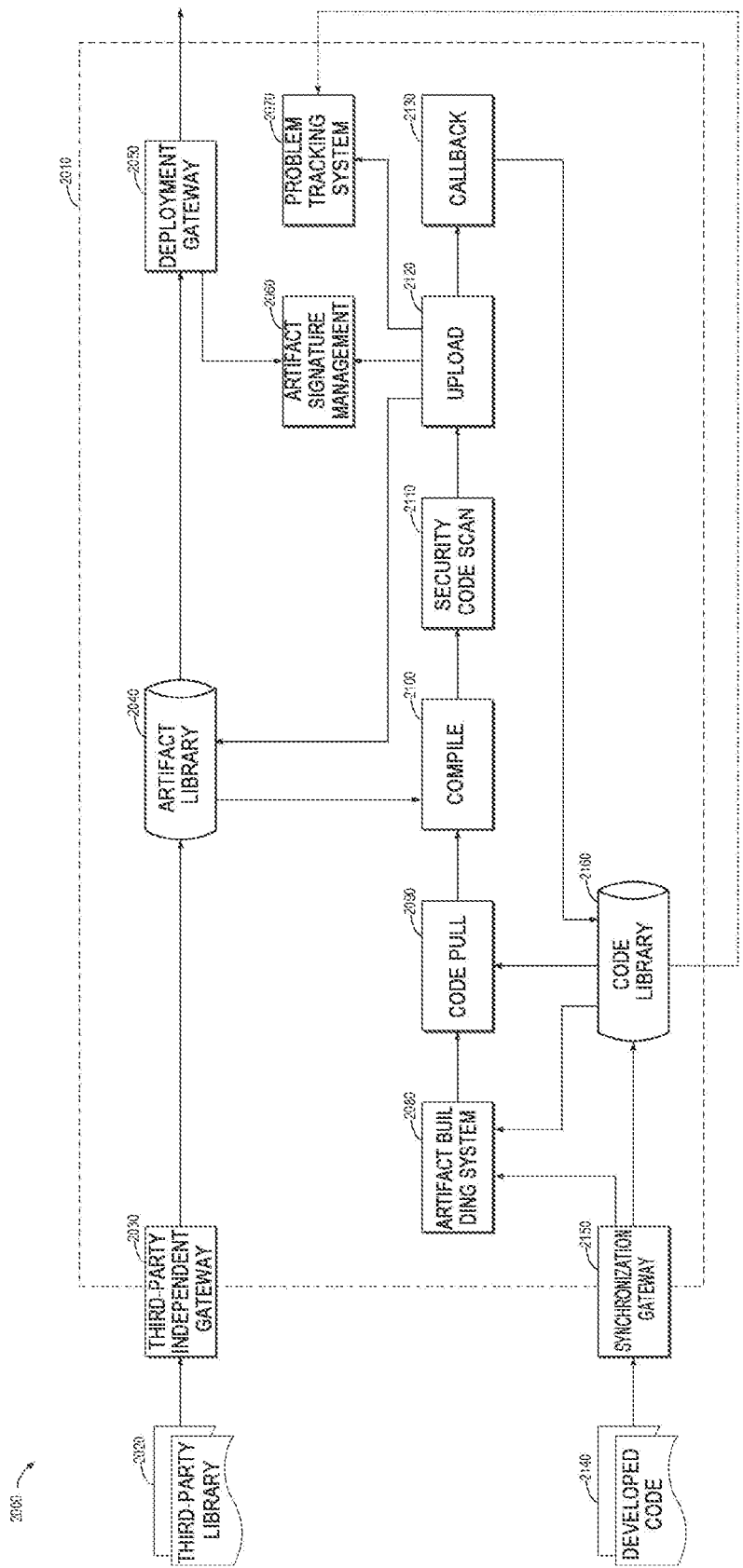
FIG. 2 shows a schematic block diagram of a computing security sub-system according to some embodiments of the present disclosure.

The security computing sub-system 1060 will be described in detail below with reference to FIG. 2. FIG. 2 shows a schematic block diagram of the security computing sub-system 1060 according to the embodiments of the present disclosure.

As shown in FIG. 2, the security computing sub-system 1060 may comprise, for example, a security code environment 2010, which may be provided by TTP. The working process of the security computing sub-system 1060 will be described in conjunction with the submission of new developed code 2140.

As shown in FIG. 2, when developers need to deploy the new developed code 2140, they may submit the developed code 2140 to the security code environment 2010 through a synchronization gateway 2150 provided by TTP. Accordingly, the developed code 2140 will be synchronized to a code library 2160 in the security code environment 2010.

In some embodiments, when developers need to use the new developed code 2140 for compiling, the developer may send a build request to an artifact building system 2080 through the synchronization gateway 2150.

Alternatively, when the code library 2160 receives the new developed code 2140, the code library 2160 may also automatically send a code merge event to the artifact building system 2080 to trigger the artifact building system 2080 to start the artifact (e.g., executable code) building process.

When the building process is started, a code pulling module 2090 may obtain a code file for building from the code library 2160. In some embodiments, the code file for building may be specified by developers or automatically determined by the artifact building system 2080.

Further, a compiling module 2100 may compile code pulled from the code library 2160 by the code pulling module 2090, for example, to compile it into intermediate code.

In some embodiments, considering that some third-party code is usually introduced during the code compiling process, the security computing sub-system 1060 also need to guarantee the security of introduced third-party code.

As shown in FIG. 2, the security computing sub-system 1060 may comprise a third-party independent gateway 2030 for checking and confirming the security of a third-party library 2020 required to be introduced. It is to be understood that such a third-party library might be a compiled link library or source code itself, for example.

The third-party library 2020 passing the security check may be added to an artifact library 2040. As shown in FIG. 2, during the artifact building process, the compiling module 2100 may obtain, from the artifact library 2040, other artifact on which a current artifact to be compiled depends, e.g., a historically compiled artifact or an artifact generated based on the third-party library 2020.

Further, the compiling module 2100 may compile the code pulled from the code library 2160 and the artifact obtained from the artifact library 2040 to generate intermediate code, so that a security code scanning module 2110 may perform code security checks.

It is to be understood that the security code scanning module 2110 managed by TTP may perform any suitable code scanning process for security checks. Such scanning rules are unknown to developers, so that the security of code compiled for final artifacts may be guaranteed.

In some embodiments, an uploading module 2120 may perform respective uploads according to a result of the security code scanning module 2110. If the security code scanning module 2110 determines that the intermediate code obtained from the compilation is secure, then the uploading module 2120 may upload an executable file obtained from the compilation to the artifact library 2040.

Further, if the security code scanning module 2110 determines that the intermediate code obtained from the compilation is secure, the uploading module 2120 may upload signature information of the executable file to an artifact signature management module 2060.

On the contrary, if the security code scanning module 2110 determines that there are respective risks in the current intermediate code, then the uploading module 2120 may upload corresponding risks to a problem tracking system 2070 to form a risk analysis report. Accordingly, the executable file obtained from the compilation may be prohibited from being uploaded to the artifact library 2040.

In some embodiments, the developed code 2140 in the code library 2160 may be provided in a trusted environment for manual check. If it is determined that there are risks in the developed code 2140, then the result may also be reported to the problem tracking system 2070.

In some embodiments, if the security code scanning module 2110 determines that there are respective risks in the current intermediate code, then the uploading module 2120 may notify a callback module 2130 to mark the respective code in the code library 2160 as risk code.

In some embodiments, the problem tracking system 2070 maintained by TTP may send the received risk report information to developers or maintainers of the developed code 2140 to remind that the current developed code 2140 cannot pass the security check and thus cannot be deployed.

In some embodiments, if the developed code 2140 passes the security check, it may be compiled into an executable file and further added to the artifact library 2040 to be deployed via a deployment gateway 2050.

In some embodiments, before deploying the artifact (i.e., the executable file) obtained from the artifact library 2040, the deployment gateway 2050 may verify through the artifact signature management system 2060 whether the signature of the artifact is valid. After the validity of the artifact's signature is confirmed, the deployment gateway 2050 may deploy the artifact generated based on the developed code 2140 to the network.

In some embodiments, the artifact may be an application program executed at a client device, and then the deployment gateway 2050 may issue a generated installation file (e.g., apk file) to a respective application store to be downloaded by users. Thereby, the embodiments of the present disclosure may guarantee that installation files which can be downloaded and installed by users are always issued by the security code environment 2010 via the deployment gateway 2050.

In some embodiments, the artifact may be a service program to be deployed into the target application platform 1030, for example Specifically, the maintainer of the target application might initiate a request for deploying a specific artifact to the target application platform 1030 to the deployment platform. Accordingly, after the request is approved, the target application platform 1030 may obtain from the artifact library 2040 the specific artifact to be deployed and authenticate the signature of the specific artifact. After the signature of the artifact passes the authentication, the artifact may be deployed to the target application platform 1030 through a virtual machine or container, for example.

Thereby, based on the discussed security computing subsystem, the embodiments of the present disclosure can effectively monitor the process of translating code into an application program or service program which will be deployed and used, from various cycles such as code uploading, code writing, code compiling and third-party library referencing. In this way, the embodiments of the present disclosure can effectively avoid various security vulnerabilities or compliance risks introduced in the source code.

Data Exchange Sub-System

The operation of applications involves data interaction between application platforms under the jurisdiction of different countries and regions. For example, in the example shown in FIG. 1, it is desirable to interact data between the target application platform 1030 and a target application platform where the same application is operating RoW, to provide the global data interaction of the application. As described above, the data exchange sub-system (DES) 1040 may support the synchronization of public data of the target application and other data that meets rules between different platforms and guarantee the security and compliance of data being exchanged. In general, the DES 1040 is configured to detect whether data between different platforms meets a data exchange constraint. Data exchange constraints may comprise constraints which are set to meet national or regional laws and regulations, and constraints which are set due to the requirements of enterprises, organizations, and/or other aspects of user protection, etc.

For example, in countries or regions with specific data sovereignty protection requirements, TTP may be required to conduct inspections involving data sovereignty protection. Therefore, in many cases involving cross-platform data exchange, it is necessary to protect the security and compliance of data exchange. In particular, after the TTP computer room is set up, the data exchange between the outside and the TTP computer room will be restricted, and it is hoped that data interacted with the TTP party will be checked by the data sovereignty protection. In such examples, the data exchange constraint may comprise rules related to data sovereignty protection requirements of specific countries or regions.

Such interactive data may be divided into two aspects. One aspect includes intercommunication data between platforms, and the other includes operation and maintenance data such as access to or operation of a platform by the operation and maintenance staff of the platform. The intercommunication data is mainly used for synchronization between two platforms to guarantee the functional integrity of applications, and such data needs to go through the DES system for security and compliance checks. The intercommunication data includes, for example, online business data, offline data, etc. The check of operation and maintenance data is to guarantee that the operations of the operation and maintenance staff at the operation and maintenance control plane are also compliant.

Figure 3A:
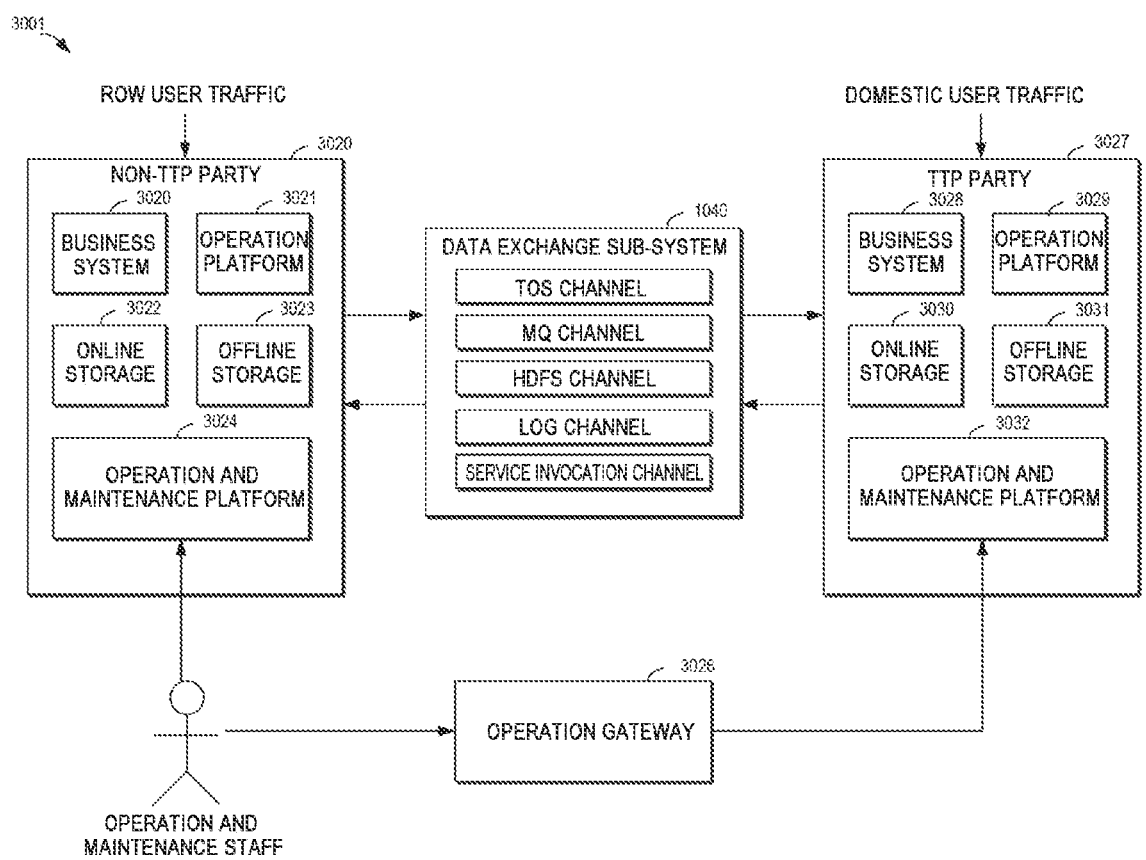
FIG. 3A shows an example deployment environment in which a data exchange sub-system is deployed according to some embodiments of the present disclosure.

FIG. 3A shows an example deployment environment 3001 where a DES 1040 is deployed according to some embodiments of the present disclosure.

In FIG. 3A, a TTP party 3027 refers to an environment that needs the TTP supervision and constraint in a specific country or region. The TTP party 3027 may involve various components for operating, managing and maintaining a target application, for example, including a business system 3028, an operation platform 3029, an online storage 3030, an offline storage 3031, etc. The TTP party 3028 further comprises an operation and maintenance platform 3032, and the operation and maintenance staff needs to access the operation and maintenance platform 3032 to realize the access to, management or maintenance of the target application.

Similarly, a non-TTP party 3020 refers to an environment to which one or more other countries or regions other than the specific country or region belong, which is free of the data exchange constraint of the country or region where the TTP party 3027 is located. The non-TTP party 3020 may involve various components for operating, managing and maintaining a target application, for example, including a business system 3020, an operation platform 3021, an online storage 3022, an offline storage 3023, etc. The non-TTP party 3020 further comprises an operation and maintenance platform 3024, and the operation and maintenance staff needs to access the operation and maintenance platform 3024 to realize the access to, management or maintenance of a local application or application platform.

The domestic user traffic will flow through some components of the TTP party 3027, and the RoW user traffic will flow through some components of the non-TTP party 3020. As used herein, the "domestic user traffic" refers to the user traffic generated on application platforms under the jurisdiction of the specific country or region, and the "RoW user traffic" refers to the user traffic generated on application platforms under the jurisdiction of one or more other countries or regions other than the specific country or region.

In the environment of FIG. 3A, the intercommunication data comprises the domestic user traffic and RoW user traffic interacted between the TTP party and the non-TTP party. The intercommunication data will go through the DES 1040 for checks in aspects of data security, compliance and the like. In addition, an operational gateway 3026 may further be set, to perform data security and compliance checks on the operation and maintenance data.

As to be discussed in detail below, in the DES 1040, different data channels may be set according to the type of data to check the to-be-exchanged data in a respective channel FIG. 3A schematically shows some channels, including a target object storage (TOS) channel, a message queue (MQ) channel, an offline aggregated data channel, a log channel, a service invocation channel, etc.

For both parties of data exchange, they may have their own DESes to achieve data protection, for example, for protecting incoming data and/or outgoing data.

Figure 3B:
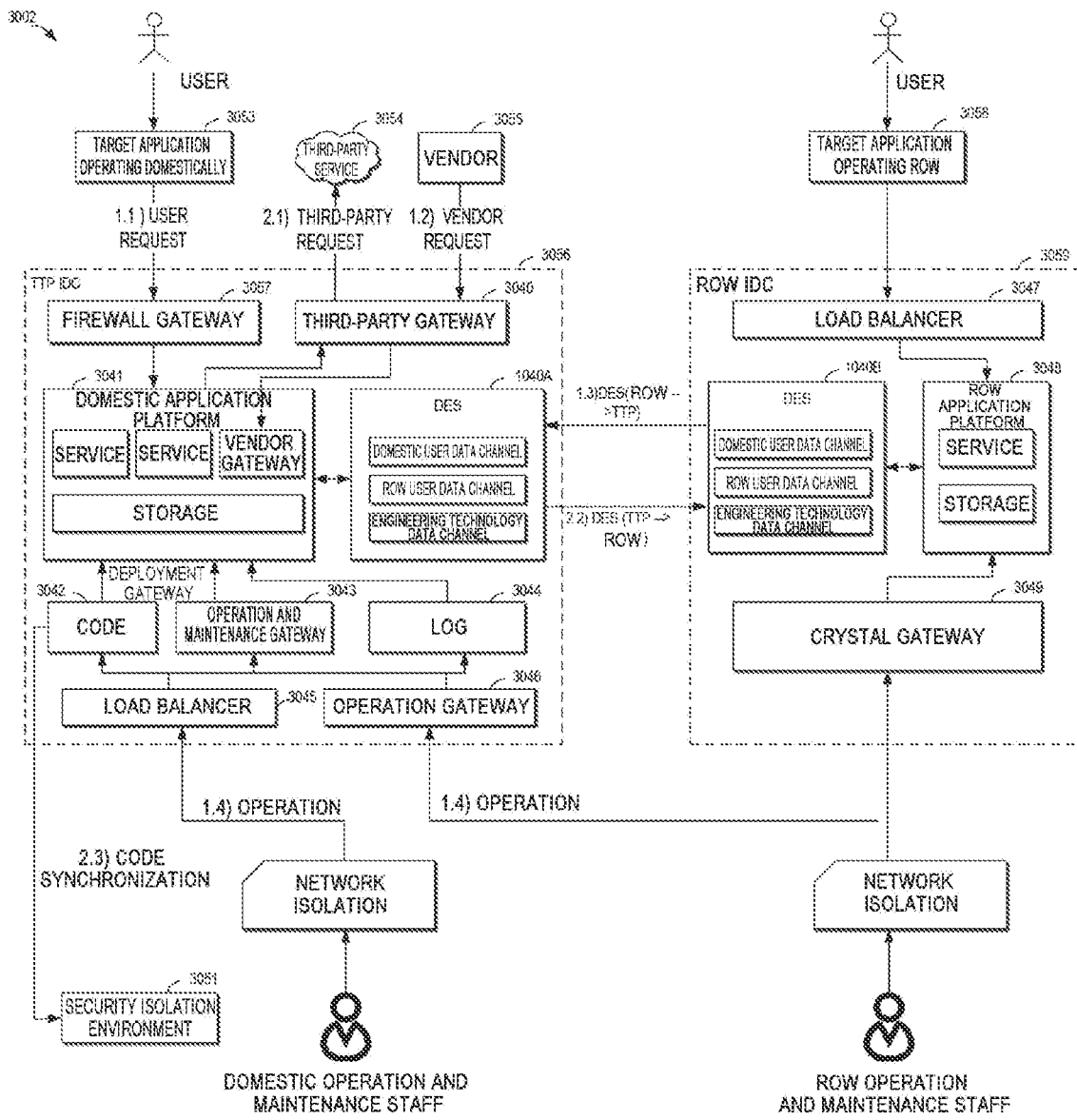
FIG. 3B shows an implementation of DES in an internal data center (IDC) at the TTP side and an Rest of World (RoW) IDC where non-TTP is located according to some embodiments of the present disclosure.

FIG. 3B further shows the implementation of the DES 1040 in the internal data center (IDC) of the TTP party and the RoW internal data center (RoW IDC) where the non-TTP is located.

In FIG. 3B, a TTP IDC 3056 refers to an IDC of the target application operating in the specific country or region, which is under the data protection testing of the TTP. An RoW IDC 3059 refers to an IDC of the target application operating in one or more other countries or regions other than the specific country or region, which might be subject to the data protection constraint of other countries or regions.

As shown in FIG. 3B, a DES 1040A is implemented in the TTP IDC 3056 and used to detect incoming and/or outgoing data. A DES 1040B is implemented in the RoW IDC 3059 and used to detect incoming and/or outgoing data. Both the DES 1040A and the DES 1040B may be considered as specific deployment instances of the DES 1040.

From the perspective of the TTP IDC 3056, the incoming or outgoing data may include various types of data, which will be described with examples.

As shown in FIG. 3B, for the TTP IDC 3056, the outside incoming data may include a user request, e.g., a proactive request initiated by a user in a specific country or region through a target application 3058 operating inside. As to be described in other portions of this specification, in some embodiments, the user request may further go through a firewall gateway 3057 in the TTP IDC 3056 and/or a mobile sandbox for security protection. The user request will reach a domestic application platform 3041 in the TTP IDC 3056 for further processing. In some example, the domestic application platform 3041 may comprise various services, vendor gateways, storage and other components. In addition, if the user request is to be transferred to a data center other than the TTP IDC 3056, the user request will be delivered to the DES 1040A for data protection.

In some embodiments, for the TTP IDC 3056, the outside incoming data may further comprise a vendor request initiated by a vendor 3055, e.g., requesting a specific service of a domestic application platform. For example, a third-party vendor might invoke an application program interface (API) of a domestic application platform, e.g., OpenAPI. Since it cannot be confirmed whether the third-party vendor is a domestic user, the vendor request will be sent via a third-party gateway 3040 in the TTP IDC 3056 to the vendor gateway in the domestic application platform 3041 for check, to determine whether it is a domestic user. If the vendor initiating the request is a domestic user, then the vendor request may be responded normally. If the vendor initiating the request is an RoW user, then the vendor request will go through the DES 1040A before being transferred.

In some embodiments, for the TTP IDC 3056, the outside incoming data may further comprise data which is synchronized from the RoW IDC 3059 to the TTP IDC 3056. For example, if the incoming data from the RoW needs the data security audit, the incoming data from the RoW also needs to be processed by the DES 1040A.

In some embodiments, for the TTP IDC 3056, the outside incoming data may further comprise the operation and maintenance operations of the TTP IDC 3056 by the operation and maintenance staff, e.g., changes to the TTP IDC 3056. Such operations may include code type changes, configuration type changes, log maintenance, etc. Code type changes may comprise the launch of new functions, the release of bin files, and so on. Code type changes may be executed by the domestic operation and maintenance staff of the application platform in the country or region. Configuration type changes may include enabling or disabling some settings of the target application, scheduling traffic configuration, and so on. In some cases, configuration changes can be performed by the RoW platform operation and maintenance staff for multinational operation application platforms. Of course, this depends on the management requirements of different application. Log maintenance refers to maintaining a log 3044 in the TTP IDC 3056.

In some embodiments, the domestic or RoW operation and maintenance staff may perform operation and maintenance operations on the TTP IDC 3056 under conditions of network isolation to further guarantee the data sovereignty protection. As shown in FIG. 3B, the domestic operation and maintenance staff initiates the operation and maintenance operation under the network isolation, and the operation and maintenance operation will be distributed via a load balancer 3045 to be distributed to code 3042, an operation and maintenance platform 3043 or the log 3044 in the TTP IDC 3056. Besides the network isolation, the operation and maintenance operation of the domestic operation and maintenance staff will further be subject to the security check via the operational gateway 3046 and then distributed to the code 3042, the operation and maintenance platform 3043 or the log 3044 in the TTP IDC 3056.

In some embodiments, for the TTP IDC 3056, the inside outgoing data may include a third-party request which is initiated from the domestic application platform 3041 during the operation of the application platform, for requesting a third-party service 3054, e.g., a third-party request in a public network. The third-party request also needs the data protection by the DES 1040A.

In some embodiments, for the TTP IDC 3056, the inside outgoing data may further comprise data which is synchronized from the TTP IDC 3056 to the RoW IDC 3059. For example, during the operation of the target application, user contents stored in the TTP IDC 3056 may need to be synchronized to the RoW IDC 3059. According to some regulations on the data sovereignty protection, such data might be the key data that DES 1040A needs to review.

In some embodiments, for the TTP IDC 3056, the inside outgoing data may further comprise code synchronization data. For example, in some cases, due to check requirements such as data sovereignty protection, a code review of the target application or application platform might be required. In order not to leak the code while meeting the requirements of data sovereignty protection, the code might be synchronized to a security isolation environment 3051 for review. The security isolation environment 3051 may be, for example, a physical environment such as a computer room that is not connected to the Internet, a monitored computer room and the like, or a virtual computing environment with security protection, etc.

From the perspective of the RoW IDC 3059, the DES 1040B deployed therein may also perform security protection on similar outside incoming data and inside outgoing data. For example, a user request which is generated by the user through the target application 3058 operating RoW may also be protected by the DES 1040B after reaching an RoW application platform 3048 (which may comprise various types of services and storage) via the load balancer 3047. In the aspect of operation and maintenance, the RoW operation and maintenance staff may also perform the operation and maintenance operation on the RoW application platform 3048 via a crystal gateway 3049 with network isolation. Such operations of operation and maintenance may be under data protection via the DES 1040B.

For data being protected in the DES 1040A or 1040B, solutions and processing for data sovereignty protection might also differ depending on different types of the data.

In the embodiments of the present disclosure, in the DES 1040 (e.g., the DES 1040A or 1040B), data may be pre-processed according to the type of data to normalized format the data formats, thereby simplifying and facilitating subsequent inspections on data sovereignty protection and accelerating the data exchange process.

Thereby, the DES 1040 may be divided into different processing portions according to the type of data. For example, according to the source of data, the DES 1040A may comprise a domestic user data channel for processing data related to users in a specific country or region; an RoW user data channel for processing data related to users RoW; an engineering technology data channel for processing engineering, operation and maintenance data, such as code, parameters and other research and development data, operation and maintenance data, etc. Further, data in each channel may further be divided depending on processing techniques such as data generation, transmission, receiving and storage. As to be described below, divided by techniques, data in different channels may be divided into one or more of message queue (MQ) data, offline aggregated data, target object storage (TOS) data and service invocation data, or other types of data.

For data passing the data sovereignty protection review, data in the normalized format may be converted back to data in the original format and provided to a respective destination. According to the solution of the present disclosure, due to different sources of data, different types of data differ in the data format, processing technique and other aspect. Through the normalized pre-processing and post-processing, the complexity in the subsequent review stage of data sovereignty protection may be reduced. In addition, with the update of data sources and technical expansion/changes, it is possible to only change the pre-processing and post-processing of data, instead of making complex changes to the processing in the data exchange constraint determining stage. Therefore, the data exchange architecture has great flexibility and scalability.

With reference to the accompanying drawings, a detailed description is presented below to some specific embodiments.

Overall Architecture and Data Flow of DES

Figure 3C:
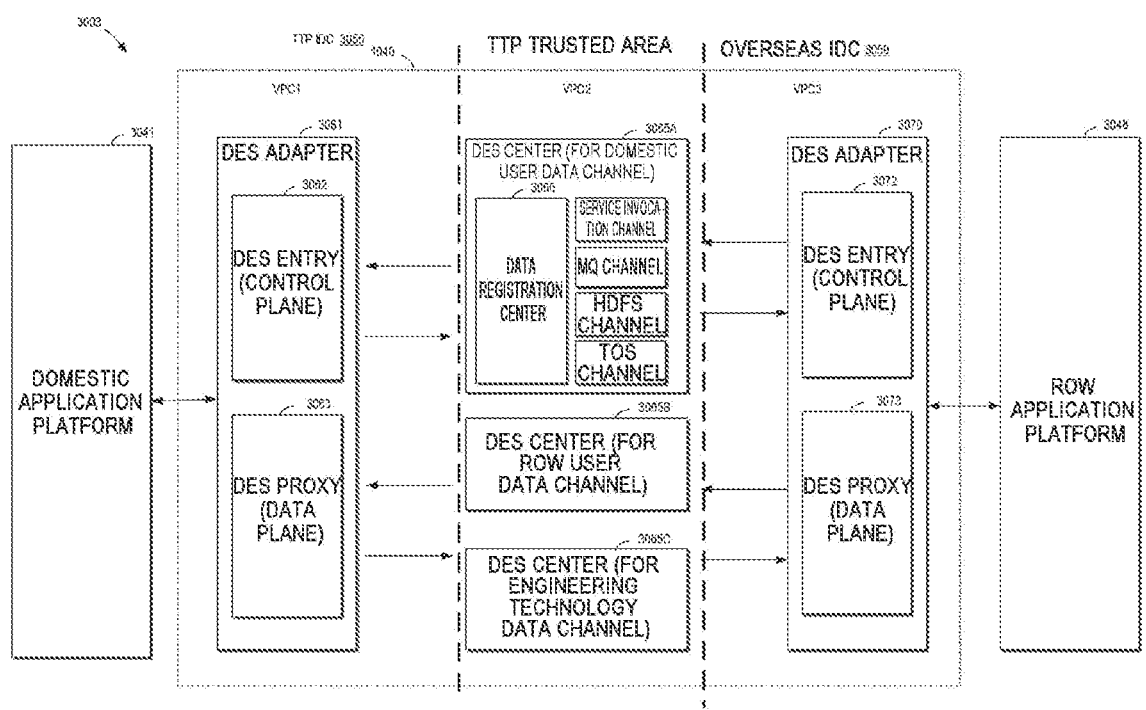
FIG. 3C shows a block diagram of example architecture of DE according to some embodiments of the present disclosure.

FIG. 3C shows a block diagram of example architecture of a DES 1040 according to some embodiments of the present disclosure. In the example of FIG. 3C, the DES 1040 is shown as synchronizing data between the domestic application platform 304 and an external application platform (collectively referred to as the RoW application platform 3048) for the target application and performing a determination of a data exchange constraint.

As shown in FIG. 3C, the DES 1040 may comprise a DES adapter 3061, a DES center and a DES adapter 3070. The DES center may comprise DES centers for different types of data channels, e.g., a DES center 3065A for domestic user data, a DES center 3065B for RoW user data, and a DES center 3065C for engineering technology data, etc. The DES centers 3065A, 3065B and 3065C have different synchronization abilities. For the sake of description below, the DES centers 3065A, 3065B and 3065C may be collectively referred to as the DES center 3065.

The DES adapter 3061 is connected with the domestic application platform 3041 to receive data to be synchronized and detected via the DES 1040 from the domestic application platform 3041, send data received from the domestic application platform 3041 and detected by the DES 1040 to the RoW application platform 3048, and receive data to be synchronized and detected by the DES 1040 from the RoW application platform 3048. The DES adapters 3061 and 3070 are both interconnected with the DES center 3065 to transfer data to the DES center 3065.

Each DES center 3065 is configured to detect data by using a data exchange constraint to guarantee the security and compliance of data exchanged between two application platforms. Usually, data meeting the data exchange constraint will be delivered to a respective destination through the DES 1040, while data that does not meet the data exchange constraint might be rejected by the DES 1040.

The DES adapter 3061 and 3070 may be configured to perform pre-processing and post-processing on data to be transferred to the DES center 3065, so that the DES center 3065 may determine whether the data exchange constraint is met based on the normalized data corresponding to various data types.

In some embodiments, the DES adapter 3061 and the DES center 3065 in the DES 1040 may be implemented in the TTP IDC 3065 together with the domestic application platform 3041, and the DES adapter 3070 may be implemented in the RoW IDC 3059 together with the RoW application platform 3048.

In some embodiments, different components in the DES 1040 may be isolated to further guarantee more effective data isolation. Such data isolation may be implemented by deploying different components in different data centers. In some embodiments, data isolation may be realized by applying virtual private data center (VPC) technology. For example, as shown in FIG. 3C, the DES adapter 3061 may be implemented in VPC1, and various DES centers may be implemented in VPC2, and the DES adapter 3070 may be implemented in VPC3. The determining of the data security and compliance in the DES center 3065 may be performed by TTP. In the case of data isolation, VPC1 and VPC3 do not have a direct communication connection between them, while VPC1 and VPC3 each have a direct communication connection with VPC2 and may communicate data/information. Through the data isolation brought by VPC technology, the DES center 3065 deployed in VPC2 may be an area trusted by TTP (referred to as a TTP-trusted area).

In some embodiments, the DES adapter 3061 may comprise a DES entry 3062, which may perform the control-plane processing, for example, apply for creating and managing data channels, registration rules, etc. by the operation and maintenance staff, and may view the data in the channel by TTP. The DES adapter 3061 may further comprise a DES proxy 3063 which may perform the data-plane processing, such as data verification, data filtering, data conversion, data sampling, log detection, etc. Similarly, in some embodiments, the DES adapter 3070 may comprise a control-plane DES entry 3072 and a data-plane DES proxy 3073.

In some embodiments, for domestic user data channels, the DES center 3065A may comprise a DES registration center for registering data exchange constraints, configuration data, etc. The DES center 3065A may further comprise refined channels, including service invocation channels for service invocation data, MQ channels for MQ data, HDFS channels for offline aggregated data (where HDFS is referred to as Hadoop distributed file system), and TOS channels for TOS data. Offline aggregated data comprises, for example, highly parallel integrated virtual environment (HIVE) type data.

Service invocation data comprises data for remote service invocations using various network protocols or invocation protocols, such as HTTP protocol or RPC protocol. MQ data may comprise data supporting MQ protocol and similar protocol, for example, including data stored in various databases (e.g., MySQL, Redis database). Offline aggregated data may comprise data in file systems based on HDFS technology, and data in file systems based on other techniques. TOS data comprises object files, such as video, audio, image, document and other media files.

In some embodiments, although not shown in FIG. 3C, the DES center 3065B for RoW user data channels and the DES center 3065C for engineering technology data channels may also comprise components similar to the DES center 3065A.

Figure 3D:
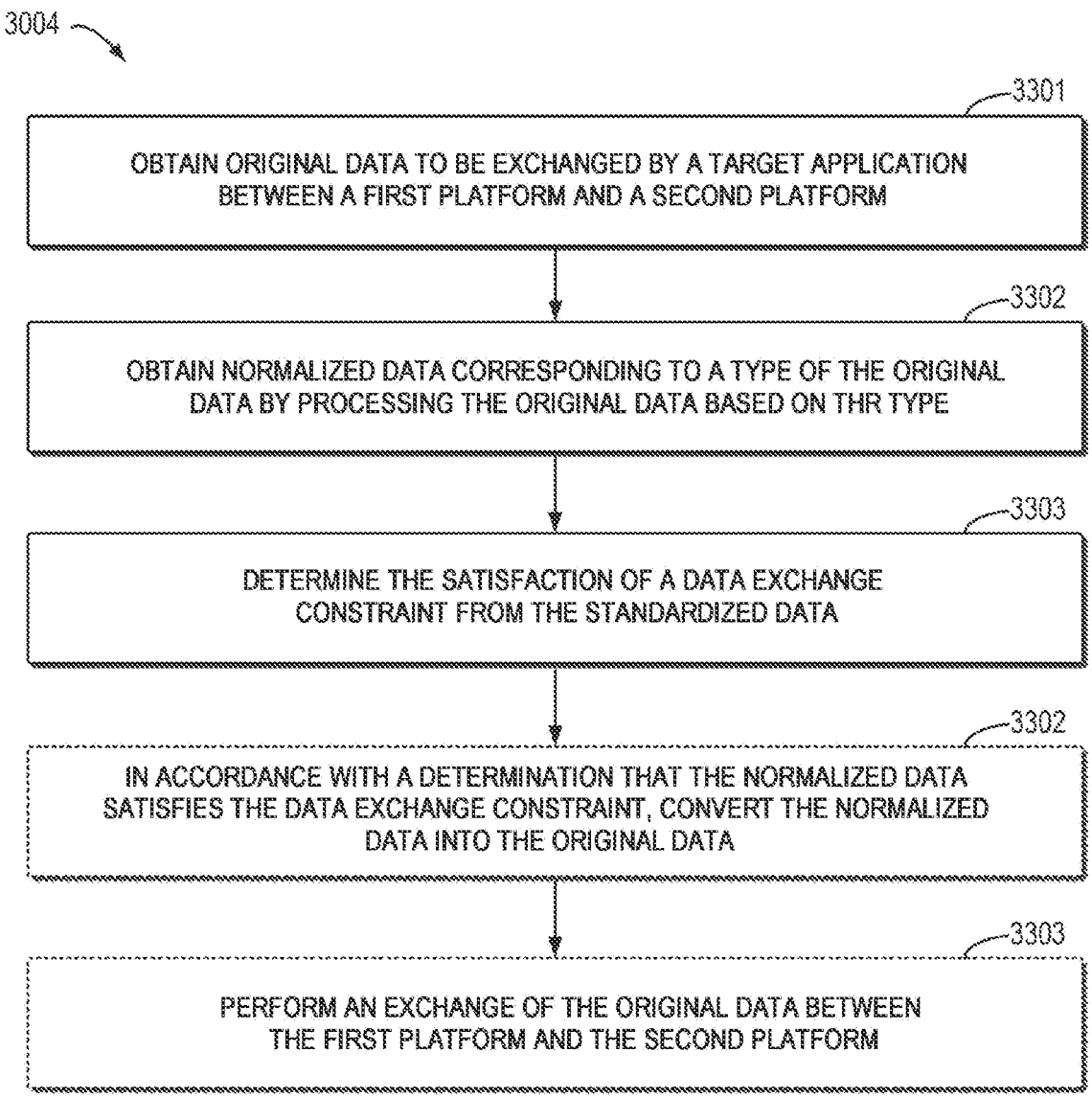
FIG. 3D shows a flowchart of a data exchange process according to some embodiments of the present disclosure.

FIG. 3D shows a flowchart of a data exchange process 300 according to some embodiments of the present disclosure. The process 300 may be implemented in the DES 1040.

As shown in FIG. 3D, at block 3301, the DES 1040 obtains original data to be exchanged by a target application between a first platform (e.g., the domestic application platform 3014) and a second platform (e.g., the RoW application platform 3048). Depending on the direction of exchange, the original data may be from the first platform and may be received by the DES adapter 3061 in the DES 1040. Or the original data may be from the second platform and may be received by the DES adapter 3070 in the DES 1040.

At block 3302, the DES 1040 processes the original data based on the type of the original data to obtain a normalized data corresponding to the type. The processing on the original data (may also referred to as pre-processing) may be determined according to the type of the original data. The type of the original data may comprise, for example, MQ data, offline aggregated data, TOS data or service invocation data, etc. Further, in some cases, the processing on the original data may also be determined according to various sources of data. For example, according to the data source, the original data may be divided into domestic user data, RoW user data or engineering technology data. Different types of data correspond to different formats, and corresponding normalized data may be generated in different ways.

In some embodiments, since techniques used by the data source differ, the same type of data might be provided in different formats, which adds requirements to the technical processing. Therefore, a normalized format may be specified. In the pre-processing stage, the format of the original data may be converted to a specified format under the type through format conversion, to normalized the data.

For example, for MQ data, MQ data in different formats may be parsed to analyze contents of messages encapsulated in different formats. For offline aggregated data and TOS data, different requests from file systems or data systems in different formats for invoking these data may be converted into file call requests implemented by uniform API. For service invocation, service invocation requests generated under different protocols may be converted into service invocation requests in a uniform protocol.

For specific pre-processing on different types of data, a more detailed description will be presented below.

At block 3303, the DES 1040 determines whether the normalized data meets a data exchange constraint. For example, the DES center 3065 in the DES 1040, especially the DES center 3065 of a corresponding data type may check whether the data exchange constraint is met or not. Through the normalized pre-processing, the DES center 3065 does not need to parse the original data by different techniques, so that the data security and compliance may be checked more conveniently by using rules.

At block 3304, if it is determined that the normalized data meets the data exchange constraint, the DES 1010 converts the normalized data into the original data. In the situation that the data exchange constraint is met, the data is allowed to be synchronized between platforms. In order to guarantee the correct synchronization of data, the DES 1040 will further process the normalized data to convert the normalized data into the original data, which has an original format.

At block 3305, the DES 1040 performs an exchange of the original data between the first platform and the second platform. Thereby, the data exchange meeting the security and compliance may be realized.

In some embodiments, as briefly mentioned above, a plurality of data channels corresponding to different type of original data may be created between different platforms, and different types of original data will be delivered to corresponding data channels for processing. Each data channel may comprise a pre-processing component, a post-processing component and a confirming component about data exchange constraint, which are suitable to process this type of original data. In addition, or alternatively, each data channel may be registered with a data exchange constraint to be applied to the specific type of original data. In this way, it is possible to realize the separation of pre-processing, confirming of data exchange constraint and post-processing for different types of data.

Data channels corresponding to different types of data may be flexibly created, updated and deleted. Thus, if the pre-processing and post-processing of data change or the data exchange constraint for the specific type of data needs to be updated, the change or update may be performed in the respective data channel without any impact on other data channels. In addition, according to business needs, if a new type of original data needs to be exchanged between the first platform and the second platform and the new type of data is also subject to the check on data sovereignty protection, then a new data channel may be created between the first platform and the second platform to process the new type of original data.

Figure 3E:
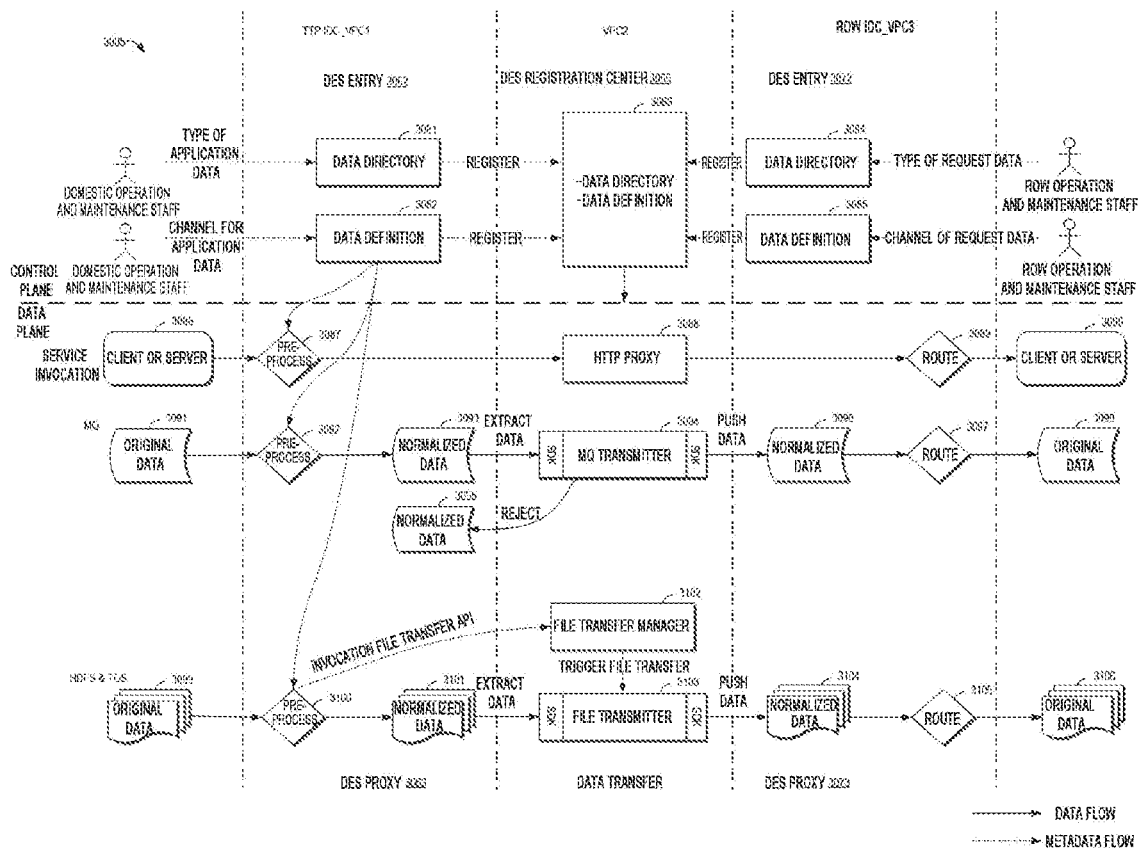
FIG. 3E shows a flowchart of an example data flow of various data processing implemented as DES according to some embodiments of the present disclosure.

FIG. 3E shows a flowchart of an example data flow 3005 of various types of data processing performed in the DES 1040 according to some embodiments of the present disclosure. The data flow 3005 involves a control-plane data flow and a data-plane data flow.

At the control plane, the operation and maintenance staff may configure one or more types of data channels in the DES 1040 and perform the update and maintenance of channels. As shown in FIG. 3E, the domestic operation and maintenance staff may, via the DES entry 3062, request to configure a specific data type and a channel for processing the specific data type and register a data directory 3081 indicating the specific data type and a data definition 3082 similar to the specific data to a DES registration center 3066. The data definition 3082 may specify channel information for processing different types of data in the DES 1040 and may comprise a pre-processing solution and a post-processing solution about a respective type of data.

Similarly, the RoW operation and maintenance staff may, via the DES entry 3072, request to configure a specific data type and a channel for processing the specific data type. The RoW operation and maintenance staff may also register a data directory 3084 indicating the specific data type and a data definition 3085 similar to the specific data to the DES registration center 3066. The data definition 3085 may specify channel information for processing different types of data in the DES 1040 and may comprise a pre-processing solution and a post-processing solution about a corresponding type of data.

At the data plane, different types of data will pass their respective channels in the DES 1040. As shown in FIG. 3E, for service invocation data, a service invocation request is exchanged between a client or a server 3086 on the TTP IDC side and a client or a server 3090 on the RoW IDC side. In order to make the service invocation request meet the data sovereignty protection requirements, the service invocation request is processed in the service invocation channel in the DES 1040.

In the example of FIG. 3E, the service invocation channel may at least comprise a pre-processing module 3087 in the DES proxy 3063, an HTTP proxy 3088 in the DES center 3065, and a routing module 3089 in the DES proxy 3073. The service invocation request from the client or server 3086 at the TTP IDC side is transferred to the pre-processing module 3087. The pre-processing module 3087 processes the service invocation request by using a data pre-processing solution specified in the data definition 3082 and sends the normalized service invocation request to the HTTP proxy 3088.

In this example, suppose the service invocation request is formatted into a request that conforms to a uniform protocol, i.e., HTTP protocol. Therefore, the HTTP proxy 3088 may, after determining that the normalized service invocation request meets the data exchange constraint, provides the normalized service invocation request through the routing module 3089 to the client or server 3090 at the other side. Before being provided to the client or server 3090, the normalized service invocation request is converted back to a service invocation request that conforms to an original protocol.

For MQ data, such a type of original data is processed in the MQ channel in the DES 1040. In the example of FIG. 3E, the MQ channel may at least comprise a pre-processing module 3092 in the DES proxy 3063, an MQ transmitter 3094 in the DES center 3065, and a routing module 3097 in the DES proxy 3073.

Original data 3091 of the MQ type is transferred to the pre-processing module 3092. The pre-processing module 3092 uses a data pre-processing solution specified in the data definition 3082 to process the original data 3091 to obtain normalized data 3093. The normalized data 3093 is extracted by the MQ transmitter 3094, e.g., extracted via a third-party software development kit (SDK). After passing the data exchange constraint check, SDK pushes normalized data 3096 that meets rules to the RoW IDC. Normalized data 3095 that does not meet rules is rejected. The routing module 3097 routes the normalized data 3096 that meets rules to a corresponding destination. Before being transmitted to the corresponding destination, the normalized data 3093 is converted back to corresponding original data 3098.

For offline aggregated data and TOS data, original data is processed in the HDFS channel and the TOS channel in the DES 1040, respectively. For the brevity purpose, FIG. 3E shows an example of a channel. However, it is to be understood that the HDFS channel and the TOS channel may comprise components which are shown. In the example of FIG. 3E, the HDFS channel and the TOS channel may at least comprise a pre-processing module 3100 in the DES proxy 3063, a file transmitter 3103 in the DES center 3065, and a routing module 3105 in the DES 3073.

Since data of the offline aggregated data type or TOS type is stored in a file system or other storage system, the pre-processing module 3100 may initiate a request for invoking a file transfer API to a file transfer manager 3102 to obtain original data 3099 of the offline aggregated data type or TOS type. The original data 3099 is transferred to the pre-processing module 3100. The pre-processing module 3100 may use a data pre-processing solution specified in the data definition 3082 to process the original data 3099 to obtain normalized data 3101.

Like the data processing of MQ type, the normalized data 3101 is extracted by the file transmitter 3103, e.g., via SDK. After passing the data exchange constraint check, SDK pushes normalized data 3104 that meets rules to the RoW IDC. Normalized data that does not meet rules is rejected and cannot be transferred to the RoW IDC. The routing module 3105 routes the normalized data 3104 that meets rules to a corresponding destination. Before being transmitted to the corresponding destination, the normalized data 3104 is converted back to corresponding original data 3106.

It is to be understood that FIG. 3E only shows the processing of outgoing data from the TTP IDC to the RoW IDC in the DES 1040. For a data flow in the opposite direction, it can also be processed through a similar process in the DES 1040, and the DES 1040 may retain a corresponding component for supporting the respective processing, especially a component in the DES adapter.

A detailed discussion is presented below to some example implementations for different types of data in the DES 1040.

Example Implementation of Data Exchange for MQ Data

Figure 3F:
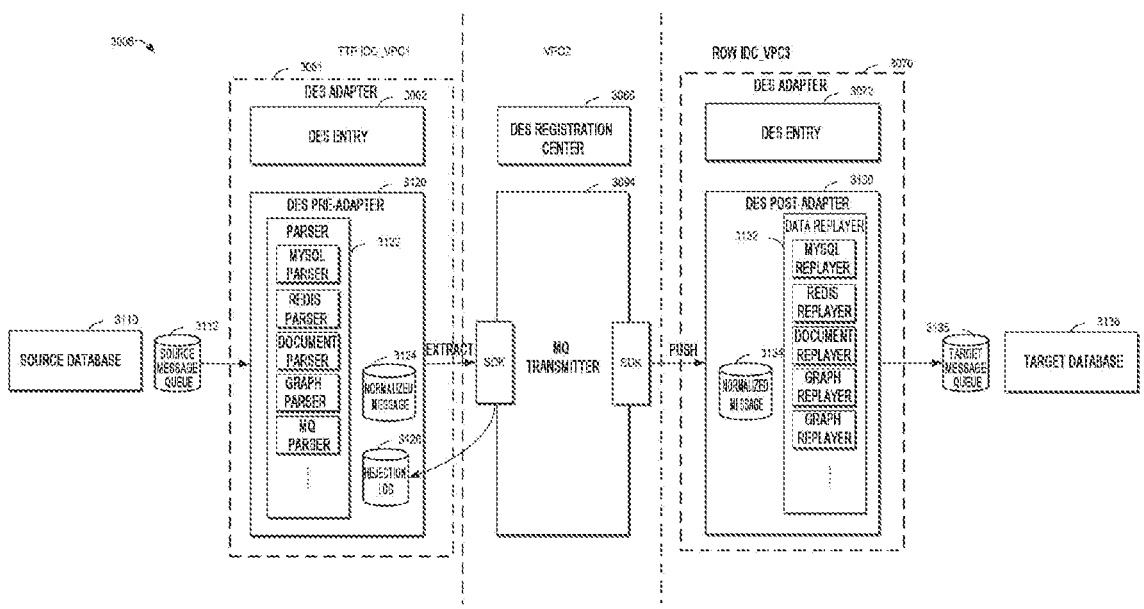
FIG. 3F shows a schematic block diagram of data exchange architecture relating to an MQ channel according to some embodiments of the present disclosure.

FIG. 3F shows a schematic block diagram of data exchange architecture 3006 involving an MQ channel according to some embodiments of the present disclosure. The data exchange architecture 3006 may be implemented in the DES 1040 for performing data security protection on MQ-type data. In the example of FIG. 3F, a data exchange from the TTP IDC to the RoW IDC is shown.

As shown in FIG. 3F, a source database 3110 in the TTP IDC generates an entity of to-be-transferred MQ data. The MQ data may comprise MQ data may include messages such as change data or business customization events, and different messages may have different formats. The MQ data generated by the source database 3110 is placed in a source message queue 3112.

In the example of FIG. 3F, the DES adapter 3061 further comprises a DES pre-adapter 3120 besides the DES entry 3062. The DES pre-adapter 3120 may be implemented as a part of the DES proxy 3063 for performing pre-processing on the MQ data from the TTP IDC to the RoW IDC. The DES pre-adapter 3120 may be configured to process MQ data in different formats into normalized MQ data in a normalized format and provide the normalized MQ data to an MQ transmitter 3094 to determine whether the data exchange constraint is met or not.

The MQ data (or message) may also comprise data generated under different protocols, data under each protocol having a customized format, so different pre-processing is required. As shown in FIG. 3F, the DES pre-adapter 3120 may comprise a parser 3122 which is configured to parse different types of original MQ data to convert different types of original data into normalized data in a normalized format. As shown in FIG. 3F, the DES pre-adapter 3120 may comprise a MySQL parser for parsing data generated through the MySQL protocol, e.g., change data capture (CDC) data; a Redis parser for parsing data generated through the Redis protocol, such as CDC data; a document parser for parsing data in the document database, especially CDC data; a graph parser for parsing data in a graph database, especially CDC data; an MQ parser for parsing different types of business event data sent through a message queue, etc. It is to be understood that the parser 3122 is flexibly scalable, wherein more, fewer or other parsers can be set for parsing a respective type of MQ data.

The normalized MQ data obtained from the parse may also be in the form of a message queue and may be placed in a queue 3124 of normalized messages. In VPC2 of TTP IDC, the MQ transmitter 3094 in charge of MQ data may extract the parsed normalized MQ data from the normalized message queue 3124 through the SDK for data security and compliance checks. Normalized MQ data that does not meet the data security and compliance check is rejected by the MQ transmitter 3094 and recorded in a rejected log 3126. Normalized MQ data that meets the data exchange constraint is pushed via the SDK to a DES post-adapter 3130 in the DES adapter 3070.

The DES post-adapter 3130 may be implemented as a part of the DES proxy 3073 to perform post-processing on the normalized MQ data from the TTP IDC to the RoW IDC to transfer data to a destination. The normalized MQ data that meets the data exchange constraint is pushed to the DES post-adapter 3130 via the SDK.

The DES post-adapter 3130 may comprise a data replayer 3132 for performing post-processing on the normalized MQ data. Specifically, the DES post-adapter 3130 may be configured to convert the normalized MQ data into original MQ data. Therefore, the DES post-adapter 3130 may comprise replayers corresponding to different types of MQ data, for conversion from a normalized format to respective customized formats. As shown in FIG. 3F, the DES post-adapter 3130 may comprise a MySQL replayer for converting normalized MQ data into MQ data that conforms to the MySQL protocol; a Redis replayer for converting normalized MQ data into MQ data that conforms to the Redis protocol; a document replayer for converting normalized MQ data into original data in the graph form; an MQ replayer for converting normalized MQ data into original data that conforms to the MQ protocol, etc.

The converted original MQ data may be placed in a queue 3134 of normalized messages and may be synchronized to a target message queue 3135. The target message queue 3135 is used for save MQ data which is indirectly synchronized from a source message queue 3112 via the DES 1040. The target database 3136 may obtain desired MQ data from the target message queue 3135.

FIG. 3F only shows components involved in the data exchange from the TTP IDC to the RoW IDC. The example in FIG. 3F shows the data exchange from the RoW IDC to the TTP IDC. The DES 1040 may comprise similar components for processing the data exchange in this direction, for example, the DES adapter 3070 may comprise a DES pre-adapter with similar functions to the DES pre-adapter 3120, and the DES adapter 3061 may comprise a DES post adapter with similar functions to the DES post-adapter 3130. For the brevity purpose, the processing in this direction is not detailed.

It is to be understood that the component for processing the MQ data exchange in the DES as shown in FIG. 3F are merely exemplary. In other examples, depending on needs, different functional modules may further be refined, combined and the like in other way, and may further comprise more, less or different functional modules.

Example Implementation of Data Exchange for Offline Aggregated Data

Figure 3G:
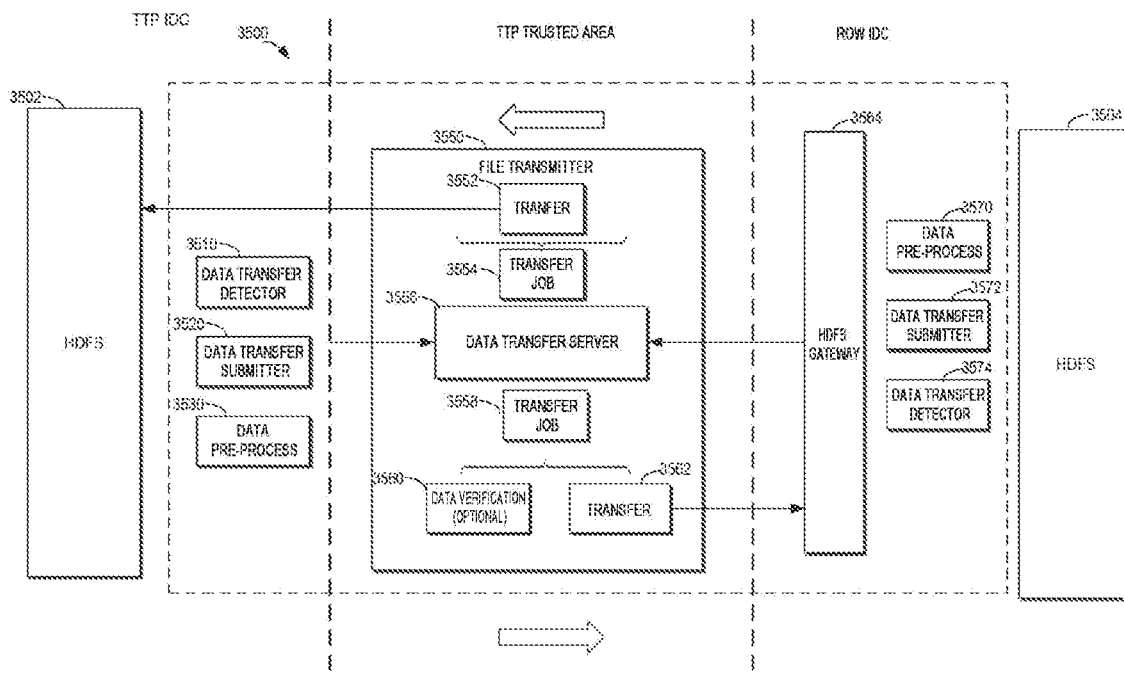
FIG. 3G shows a schematic block diagram of data exchange architecture relating to an HDFS channel according to some embodiments of the present disclosure.

FIG. 3G shows a schematic block diagram of data exchange architecture 3500 involving the HDFS channel according to some embodiments of the present disclosure. The data exchange architecture 3500 may be implemented in the DES 1040 for performing data security protection on offline aggregated data. In the example of FIG. 3G, there is shown an offline aggregated data exchange between an HDFS 3502 on the TTP IDC side and an HDFS 3504 on the RoW IDC side. Some offline aggregated data between the HDFS 3502 and the HDFS 3504 might need to be synchronized with each other.

As shown in FIG. 3G, in the data exchange architecture 3500, a data transfer detector 3510 on the TTP IDC side is responsible for detecting whether offline aggregated data to be transferred to the HDFS 3504 at the other side is stored in the HDFS 3052. Where offline aggregated data to be transferred is found, a data transfer submitter 3520 may submit a request for data transfer to a file transmitter 3550. Before the request is submitted to the file transmitter, a data pre-processing module 3530 is configured to perform data pre-processing to process offline aggregated data into normalized data.

In the file transmitter 3550, a data transfer server 3556 is configured to control data transfer services based on a data exchange constraint. If the data transfer server 3556 determines that the pre-processed normalized data from the HDFS 3502 conforms to the data exchange constraint, then a transfer job 3558 may be invoked to transfer the normalized data to the RoW IDC through a transfer task 3562 under the transfer job 3558. In some embodiments, the transfer job 3558 may further optionally a data verification task 3560, which may be configured to perform data verification according to needs. The normalized data passes an HDFS gateway 3564 and may be processed to obtain original offline aggregated data which is then saved in the HDFS 3504.

Similarly, in the data exchange architecture 3500, a data transfer detector 3570 on the RoW IDC side is responsible for detecting whether offline aggregated data to be transferred to the HDFS 3502 at the TTP IDC side is stored in the HDFS 3054. Where offline aggregated data to be transferred is found, a data transfer submitter 3572 may submit a request for data transfer to a file transmitter 3550. Before the request is submitted to the file transmitter, a data pre-processing module 3570 is configured to perform data pre-processing to process offline aggregated data into normalized data.

In the file transmitter 3550, if the data transfer server 3556 determines that the pre-processed normalized data from the HDFS 3504 conforms to the data exchange constraint, then a transfer job 3554 may be invoked to transfer the normalized data to the TTP IDC through a transfer task 3552 under the transfer job 3554. Original offline aggregated data is obtained through processing the normalized data and then saved in the HDFS 3502.

It is to be understood that components for processing the offline aggregated data exchange in the DES as shown in FIG. 3G are merely exemplary. In other examples, depending on needs, different functional modules may further be refined, combined and the like in other way, and may further comprise more, less or different functional modules.

Example Implementation of Data Exchange for Object Storage

In general, the TOS channel may determine whether an object file meets the data exchange constraint, and copy the object file from a source IDC (e.g., the TTP IDC or RoW IDC) to a destination IDC (e.g., the RoW IDC or TTP IDC) where the constraint is met. The object file may be, for example, a video, audio, image, document or other media file.

In some embodiments, the object file may be copied from an object storage through API to determine whether the data exchange constraint is met, and push the object file to the object storage on the destination end through API. In the data exchange of the object file, whether the data exchange constraint is met is determined through a copy request corresponding to the object file. Details of the TOS channel will be described with reference to FIG. 3H to FIG. 3J.

Figure 3H:
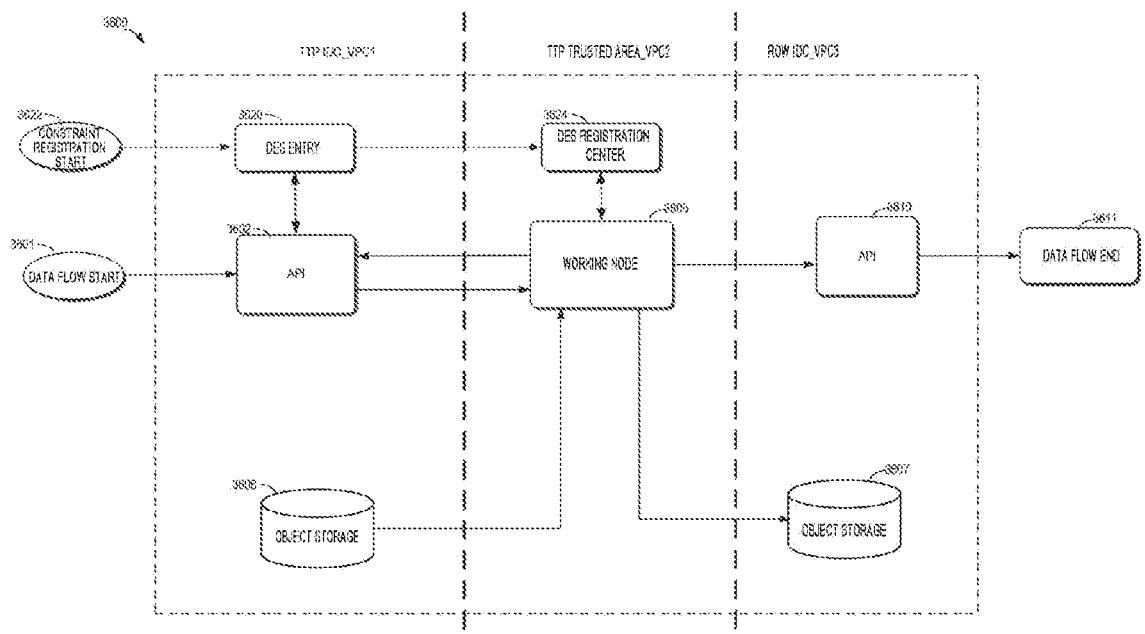
FIG. 3H shows a schematic view of a target object storage (TOS) channel for copying data from TTP IDC to RoW IDC according to some embodiments of the present disclosure.

FIG. 3H shows a schematic view of a target object storage (TOS) channel 3600 for copying data from the TTP IDC to the RoW IDC according to some embodiments of the present disclosure. In this example, data to be exchanged is an object file, which is stored in an object storage 3606 in the TTP IDC and desired to be exchanged to an object storage 3607 in the RoW IDC.

In FIG. 3H, an API 3605 in the TTP IDC is configured to push the copy request to a working node 3605 and receive from the working node 3605 a copy result which is exchanged from the RoW IDC on the other side. As depicted, when a data flow starts 3601, the copy request for the object file to be exchanged is transferred to the working node 3605 through an API 3602 (also referred to as a DES-TOS API). The copy request may indicate information related to the object file to be exchanged, e.g., a format (video, audio, text, etc.) of the object file, an identifier of the object file, and other file metadata, etc. The copy request has a normalized format.

The working node 3605 within the trusted-area VPC2 is configured to perform a determination of the data exchange constraint in response to the copy request for the target file. Specifically, the working node 3605 may determine from the normalized copy request whether the object file to be exchanged meets the data exchange constraint.

In some embodiments, at the TTP IDC side, a registration of the data exchange constraint may be initiated at the initial stage or when needed later. When the constraint registration starts 3622, the used data exchange constraint may be registered to a DES registration center 3624 in the TTP-trusted area through a DES entry 3620 in the TTP IDC. The registration of the data exchange constraint may be implemented by invoking the API 3602. The working node 3605 may access the data exchange constraint to be used currently through the DES registration center 3624.

In some embodiments, the data exchange constraint may indicate a whitelist of object files which are allowed to be exchanged or a blacklist of object files which are not allowed to be exchanged, and in each list file objects which are allowed or not allowed to be exchanged may be identified by formats, identifiers and the like of object files.

In performing the data exchange constraint, the working node 3605 allows the copy request that meets the data exchange constraint to be executed. If the copy request is allowed to be executed, the working node 3605 accesses the object storage 3606 in the TTP IDC to copy the object file to the object storage 3607 in the RoW IDC. For illegal requests (i.e., copy requests that do not meet the data exchange constraint), they will be rejected and thus cannot be executed. The working node 3605 may write the copied object file to the object storage 3607 through an API 3610 in the RoW IDC. Thus, the data flow ends 3611.

Figure 3I:
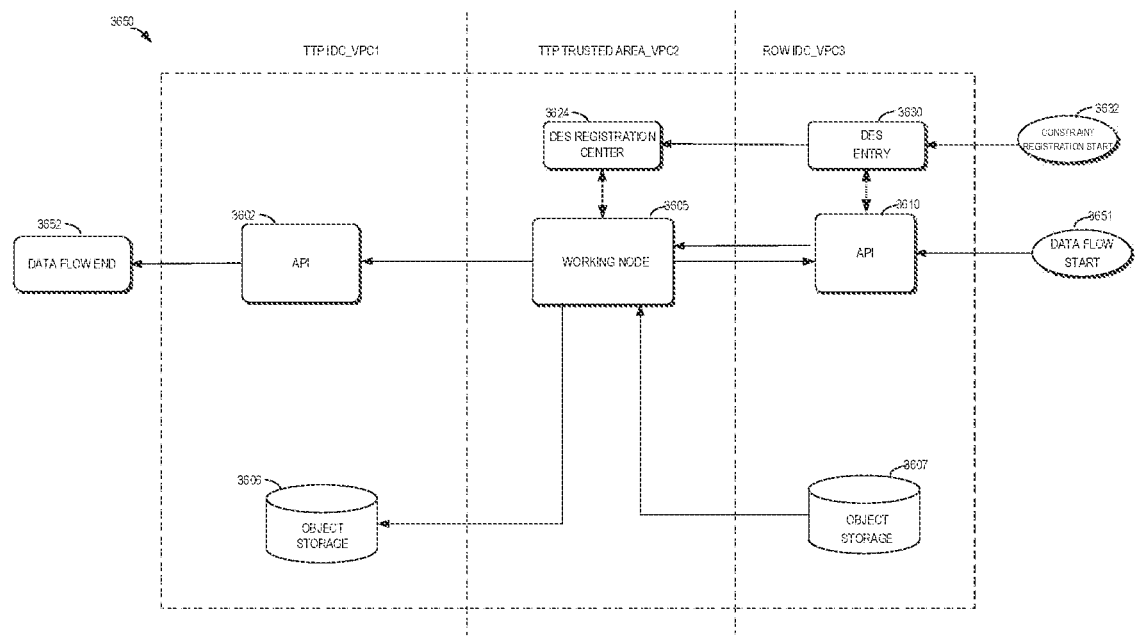
FIG. 3I shows a schematic view of a TOS channel for copying data from RoW IDC to TTP IDC according to some embodiments of the present disclosure.

FIG. 3I shows a schematic view of a TOS channel 3650 for copying data from the RoW IDC to the TTP IDC according to some embodiments of the present disclosure. In this example, an object file to be exchanged is stored in the object storage 3607 in the RoW TTP IDC and desired to be exchanged to the object storage 3606 in the TTP IDC.

In FIG. 3I, the API 3610 in the RoW IDC is configured to push the copy request to the working node 3605 and receive from the working node 3605 a copy result which is exchanged from the TTP IDC on the other side. As shown in FIG. 3I, when a data flow starts 3651, the copy request for the object file to be exchanged is transferred to the working node 3605 through the API 3610. The copy request may indicate information related to the object file to be exchanged, e.g., a format (video, audio, text, etc.) of the object file, an identifier of the object file, and other file metadata, etc. The copy request has a normalized format. The working node 3605 within the trusted-area VPC2 may determine from the normalized copy request whether the object file to be exchanged meets the data exchange constraint.

In some embodiments, on the RoW IDC side, a registration of the data exchange constraint may be initiated at the initial stage or when needed later. When the constraint registration starts 3632, the used data exchange constraint may be registered to the DES registration center 3624 in the TTP-trusted area through a DES entry 3630 in the RoW IDC. The registration of the data exchange constraint may be implemented by invoking the API 3610. The working node 3605 may access the data exchange constraint to be used currently through the DES registration center 3624.

In performing the data exchange constraint, the working node 3605 allows the copy request that meets the data exchange constraint to be executed. If the copy request is allowed to be executed, the working node 3605 accesses the object storage 3607 in the RoW IDC to copy the object file to the object storage 3607 in the TTP IDC. For illegal requests (i.e., copy requests that do not meet the data exchange constraint), they will be rejected and thus cannot be executed. The working node 3605 may write the copied object file to the object storage 3606 through the API 3602 in the TTP IDC. Thus, the data flow ends 3652.

It is to be understood that components for processing the TOS data exchange in the DES as shown in FIGS. 3H and 3I are merely exemplary. In other examples, depending on requirements, different functional modules may further be refined, merged and the like in other way, and may further comprise more, less or different functional modules.

Figure 3J:
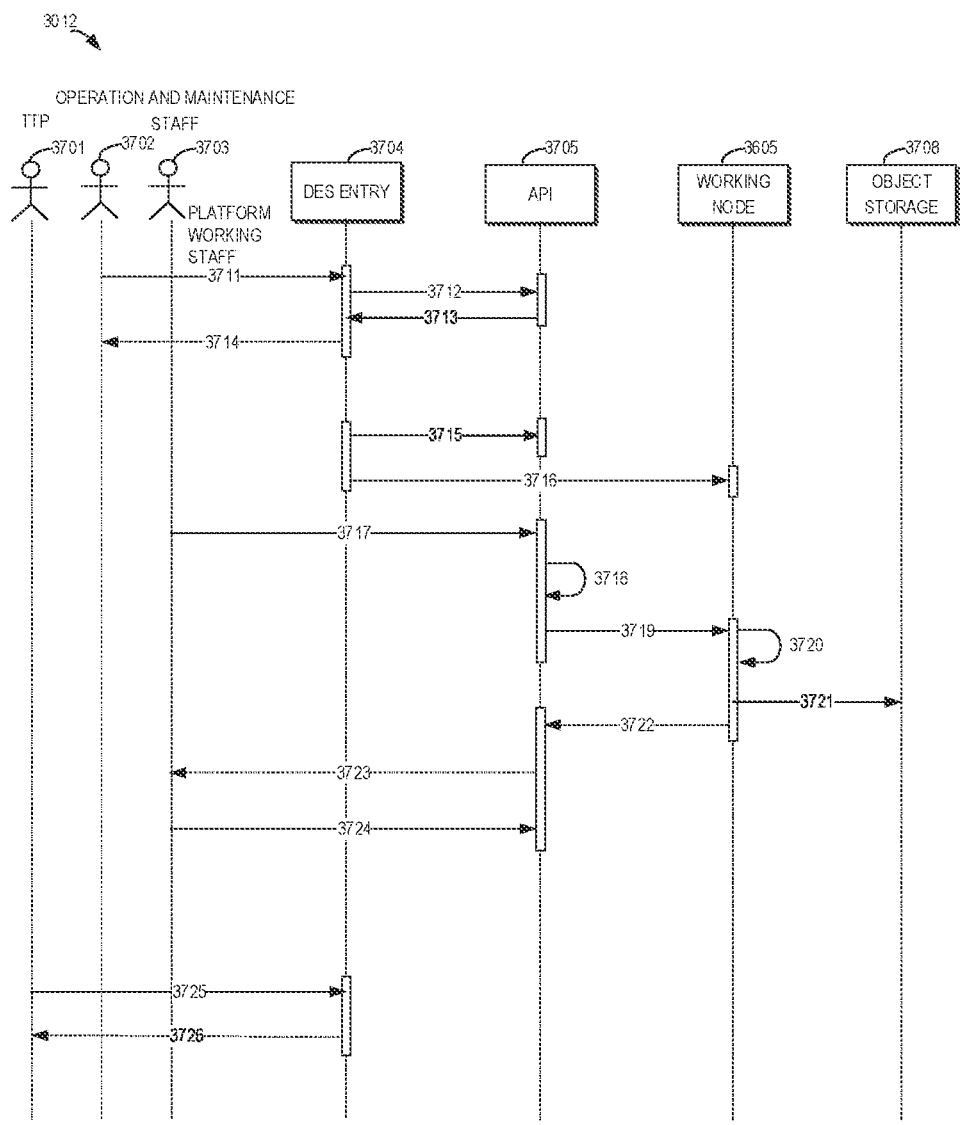
FIG. 3J shows a message sequence diagram in a TOS channel according to some embodiments of the present disclosure.

FIG. 3J shows a message sequence 3012 in the TOS channel according to some embodiments of the present disclosure. The message sequence 3012 in FIG. 3J involves a TTP 3701, operation and maintenance staff 3702, platform working staff 3703, a DES entry 3704, an API 3705, the working node 3605 and an object storage 3708.

Depending on the direction of the data exchange, the DES entry 3704, the API 3705 and the object storage 3708 in FIG. 3J may be corresponding components in any of FIGS. 3H and 3I. For example, in the TOS channel 3600 for copying data from the TTP IDC to the RoW IDC as shown in FIG. 3H, the DES entry 3704 comprises the DES entry 3620 shown in FIG. 3H, the API 3705 comprises the API 3602 shown in FIG. 3H, and the object storage 3708 comprises the object storage 3606 in FIG. 3H. In the TOS channel 3650 for copying data from the RoW IDC to the TTP IDC, the DES entry 3704 comprises the DES entry 3630 shown in FIG. 3I, the API 3705 comprises the API 3610 shown in FIG. 3I, and the object storage 3708 comprises the object storage 3607 in FIG. 3I.

In the message sequence 3012, the operation and maintenance staff 3702 registers 3711 a data exchange constraint to the DES entry 3704, which may constrain the copy of an object file between the object storage 3606 and 3607 in different IDCs. After the registration is completed, the DES entry 3704 may send 3714 a response to the operation and maintenance staff. The DES entry 3704 registers 3712 container information about the data exchange constraint to the API 3705, and the API 3705 may send 3713 a response to the DES entry 3704 after the registration is completed. Rules registered via the DES entry 3704 may be cached 3715 to the API 3705 and may also be cached 3716 to the working node 3605.

The platform working staff 3703 may initiate 3717 a copy request for the object file to the API 3705. The API 3705 may perform an authentication 3718. The working node 3605 may pull 3719 the copy request from the API 3705, and perform 3720 a determination of the data exchange constraint on the object file to be copied. If the object file is allowed to be copied, the working node 3605 performs 3721 the file copy to copy the corresponding object file from the object storage 3706. Regardless of the result of the data exchange determination, the working node 3605 will return 3722 a feedback to the API 3705. Where the object file is allowed to be copied, the feedback comprises the copied object file. Where the object file is not allowed to be copied, the feedback is used to indicate that the copy request is rejected.

In some embodiments, the platform working staff 3703 may call back 3723 the API 3705, and a copy request ID may be returned 3724 from the API 3705 to the platform working staff 3703. In some embodiments, the TTP 3701 may view 3725 situation about historical object file copies through the DES entry 3704 to confirm whether the exchange of object files in a past period of time meets the requirements of data exchange constraints. The DES entry 3704 may return 3726 a result of the view.

Example Implementation of Data Exchange Protection for Service Invocation

Figure 3K:
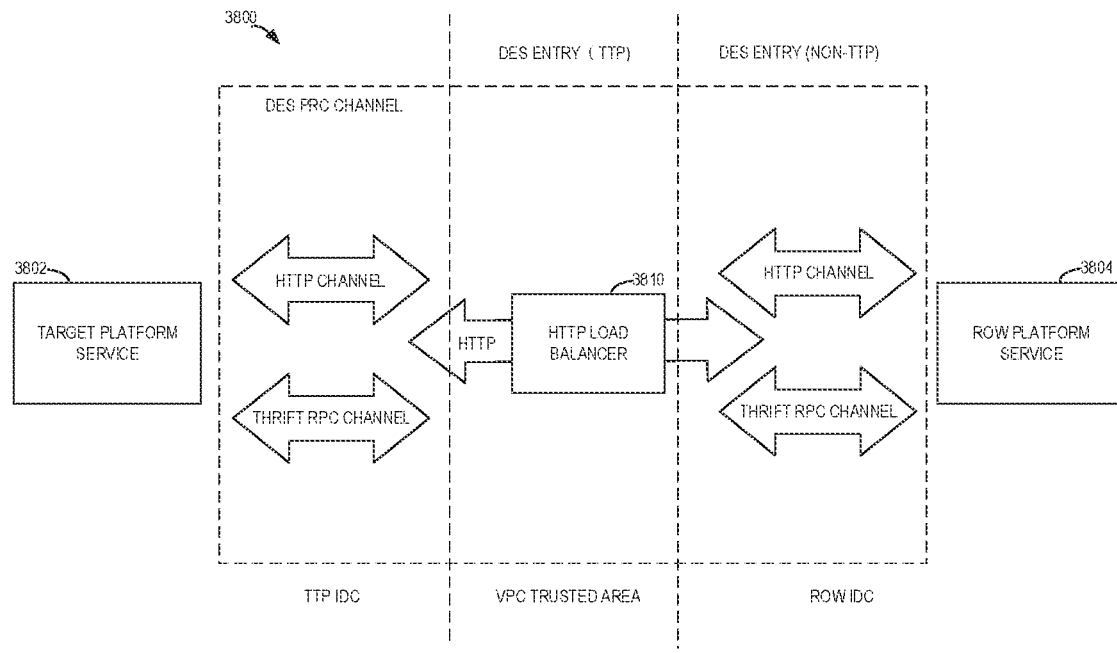
FIG. 3K shows a schematic block diagram of data exchange architecture relating to a service invocation channel according to some embodiments of the present disclosure.
Figure 3L:
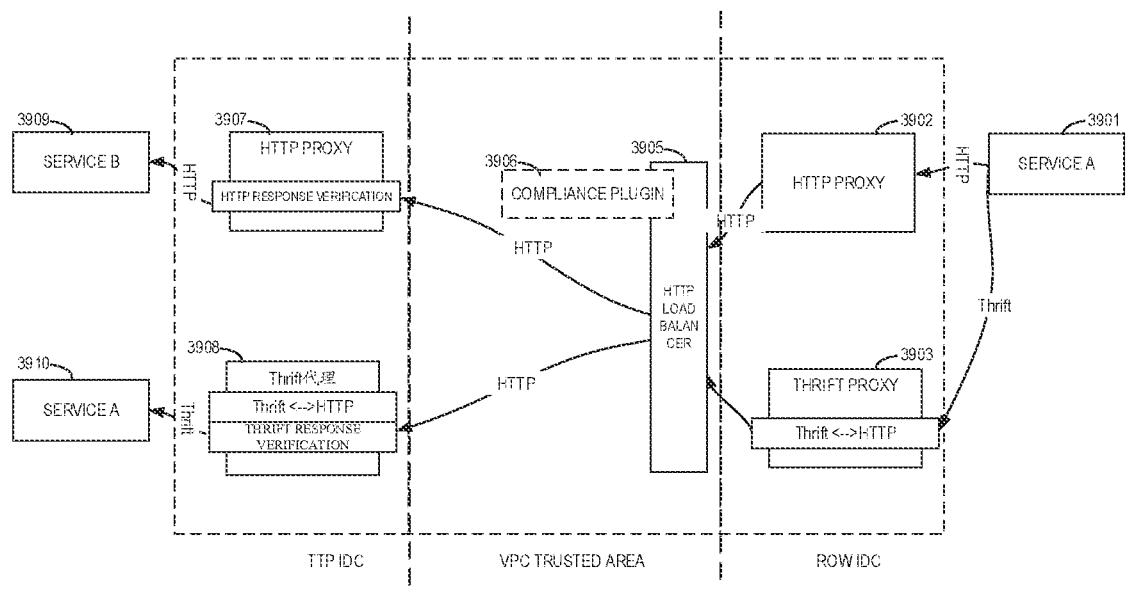
FIG. 3L shows an example of data exchange from non-TTP to TTP in a service invocation channel according to some embodiments of the present disclosure.

FIG. 3K shows a schematic block diagram of data exchange architecture 3800 involving a service invocation channel according to some embodiments of the present disclosure. The data exchange architecture 3800 may be implemented in the DES 1040 to perform data security protection on data of the service invocation type. In the example of FIG. 3L, there is shown a service invocation data exchange between a target platform service 3802 at the TTP IDC side and an RoW (non-TTP) platform service 3804 at the RoW IDC side. For example, a service on the target platform service 3802 might need to invoke a service on the RoW platform service 3804, and vice versa, a service on the RoW platform service 3804 might need to invoke a service on the target platform service 3802.

Different service platforms might apply different service invocation protocols, such as the HTTP protocol or Thrift RPC protocol. In some embodiments of the present disclosure, it is hoped that normalized data, e.g., HTTP protocol data can be processed when performing data sovereignty protection in the VPC trusted area.

In FIG. 3K, at the control plane, the non-TTP control plane is used for channel registration, channel architecture update and detection; the TTP/TTP plane is used for channel request approval, channel prohibition, channel detection, etc. At the data plane, an HTTP load balancer 3810 is an L7 balancer product from TTP Cloud, which is a key component for ensuring all DES-RPC channel traffic to pass the VPR trusted area. An HTTP channel is a channel among DES-RPC channels which supports the HTTP protocol. A Thrift RPC channel is a channel among DES-RPC channels which supports the Thrift RPC protocol. Before being sent to the HTTP load balancer of the TTP, the Thrift RPC channel will be wrapped in the HTTP channel.

At the channel registration stage, the DES-RPC channel uses channel information and data definition to declare. The channel information may comprise a channel type, such as Thrift RPC or HTTP. The channel information may further comprise an RPC call tuples. The call tuples may include src dc, src services, dst dc, dst services, rpc methods/http paths.

The data definition may depend on the direction of data flow. For a data flow from non-TTP to TTP, Thrift IDL with compliance annotations will be used to declare the response. For a data flow from TTP to non-TTP, Thrift IDL with compliance annotations will be used to declare the request. In some embodiments, only when the DES-RPC channel passes the compliance registration, the DES-RPC channel is available.

It is to be understood that the components for processing the service invocation data exchange in the DES as shown in FIG. 3K is merely exemplary. In other examples, depending on needs, different functional modules may further be refined, combined and the like in other way, and may further comprise more, less or different functional modules.

FIG. 3L shows an example of data exchange from non-TTP to TTP in the service invocation channel shown in FIG. 3K according to some embodiments of the present disclosure. As shown in FIG. 3L, an invocation initiated by service A 3901 in an RoW region will be forwarded by an HTTP proxy 3902 or a Thrift proxy 3903 to a TTP HTTP load balancer 3905. The service A 3901 may be one example of the RoW platform service shown in FIG. 3M. For an HTTP request, the invocation will be forwarded by the HTTP proxy 3902 to the HTTP load balancer 3905. For a Thrift request, the invocation will be forwarded by the Thrift proxy 3903 to the HTTP load balancer 3905.

It is suggested that the service discovery from the corresponding service proxy in the RoW IDC, such as the HTTP proxy 3902 or Thrift proxy 3903 to the VPC trusted area HTTP load balancer 3905 should be implemented through DNS, and it is suggested that the service discovery of the corresponding request to the TTP IDC area should use customized/universal service discovery.

The HTTP load balancer 3905 may comprise a compliance plugin 3906. For an illegal request, the compliance plugin 3906 will return an error. For a Thrift rpc invocation, the request will be wrapped by HTTP to generate a new HTTP request. The body of the new HTTP request is a Thrift binary file.

In the VPC trusted area, the HTTP load balancer 3905 of the TTP forwards requests to the HTTP proxy 3907 and the Thrift proxy 3908 of the TTP respectively, and the HTTP proxy 3907 and the Thrift proxy 3908 forwards requests to service B 3908 and service C 3910 as target services respectively. For a Thrift rpc invocation, the Thrift proxy 3908 restores an original Thrift request from the generated new HTTP request before sending the request.

The TTP HTTP proxy 3907 and the Thrift proxy 3908 check responses before sending the responses to the TTP HTTP load balancer 3905. For a response that does not pass the compliance check, an error will be returned. In addition, for the Thrift rpc invocation, the Thrift response will be wrapped by HTTP to generate a new HTTP response. The body of the new HTTP response is a Thrift binary file.

Figure 3M:
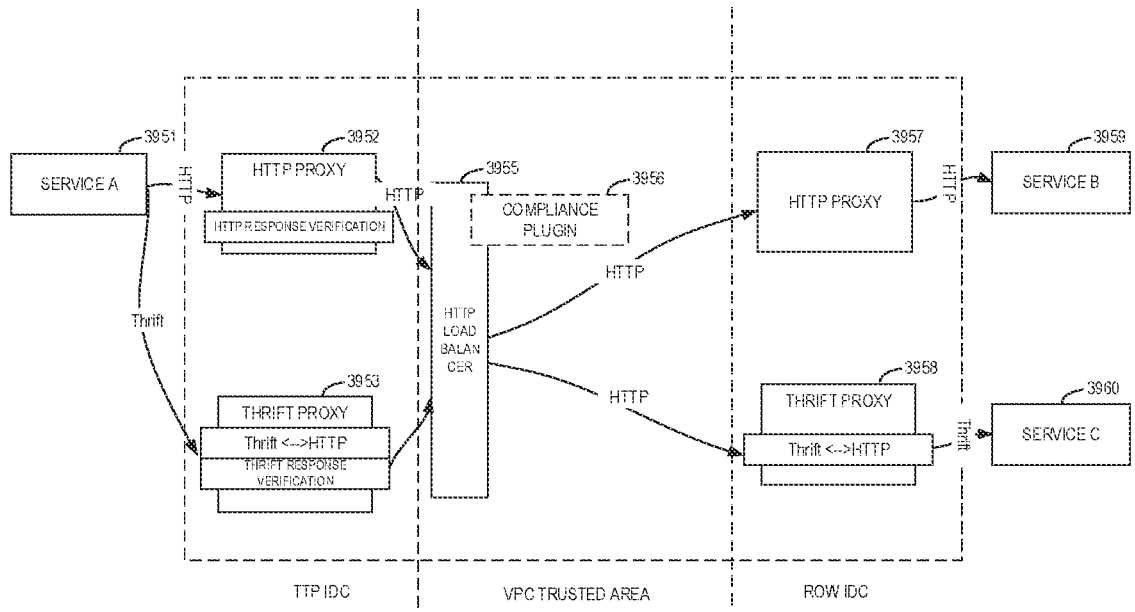
FIG. 3M shows an example of data exchange from TTP to non-TTP in a service invocation channel according to some embodiments of the present disclosure.

FIG. 3M shows an example of data exchange from TTP to non-TTP in the service invocation channel shown in FIG. 3K according to some embodiments of the present disclosure. As shown in FIG. 3M, an invocation initiated by TTP service A 3951 will be forwarded by a TTP HTTP proxy 3952 and a Thrift proxy 3953 to a TTP HTTP load balancer 3955. For an HTTP request, the invocation will be forwarded by the HTTP proxy 3952 to the HTTP load balancer 3955. For a Thrift request, the invocation will be forwarded by the Thrift proxy 3953 to the HTTP load balancer 3955.

For an illegal request, an error will be returned. For a response that does not pass the compliance check, an error will be returned. For the Thrift rpc invocation, the request will be wrapped by HTTP to generate a new HTTP response. The body of the new HTTP response is a Thrift binary file.

The HTTP load balancer 3955 of the TTP forwards requests to non-TTP (i.e., RoW) HTTP proxy 3957 and a Thrift proxy 3958 respectively. Then, the HTTP proxy 3957 and the Thrift proxy 3958 forward requests to RoW service B 39598 and service C 3960.

For a Thrift rpc invocation, the Thrift proxy restores an original Thrift request from the generated new HTTP request before sending the request.

The non-TTP HTTP proxy 3957 and the Thrift proxy 3958 send responses the TTP HTTP load balancer 3955. For the Thrift rpc invocation, the Thrift response will be wrapped by HTTP to generate a new HTTP response. The body of the new HTTP response is a Thrift binary file.

Security Sandbox Sub-System

A client application needs to communicate with a server to transmit data. The traffic data of the client application may transmit a large amount of user data. Therefore, there is a need for a method that can manage the traffic data of the client application, so that user data will not be transmitted to an unapproved server via the traffic data of the client application. For example, in the scenario of data sovereignty protection, the method may prevent user data from being transmitted to a server in a non-data sovereignty country.

However, there are great varieties of types of traffic data of client applications. Client applications may comprise mobile applications and computer (PC) applications. Traffic data of the client application may comprise native-type traffic data and Webview-type traffic data, etc. In addition, not all traffic data of the client application is under the management and control of the owner of the application. For example, traffic data of the client application may comprise traffic data from a third-party advertiser. Therefore, it is very difficult to manage various types of the traffic data for client applications.

An example embodiment of the present disclosure proposes a method for managing traffic data of a client application. The method comprises: detecting a transmission of user data of a target user from the client application to a server; analyzing traffic data of the transmission at different layers of the transmission based on types of the traffic data; and in accordance with a determination that the analysis indicates that the traffic data satisfies a data exchange constraint corresponding to the target user, transmitting the traffic data to a server in compliance with the data exchange constraint.

In this way, by analyzing the traffic data at different levels of the transmission based on the type of the traffic data and limiting the transmission of the traffic data that does not meet the data exchange constraint, it is possible to effectively prevent user data from being transmitted to an unapproved server via various types of the traffic data.

A detailed description is presented below to illustrate the embodiments of the present disclosure with reference to the accompanying drawings. A mobile application will be used as an example to illustrate the solution of the present disclosure.

Figure 4A:
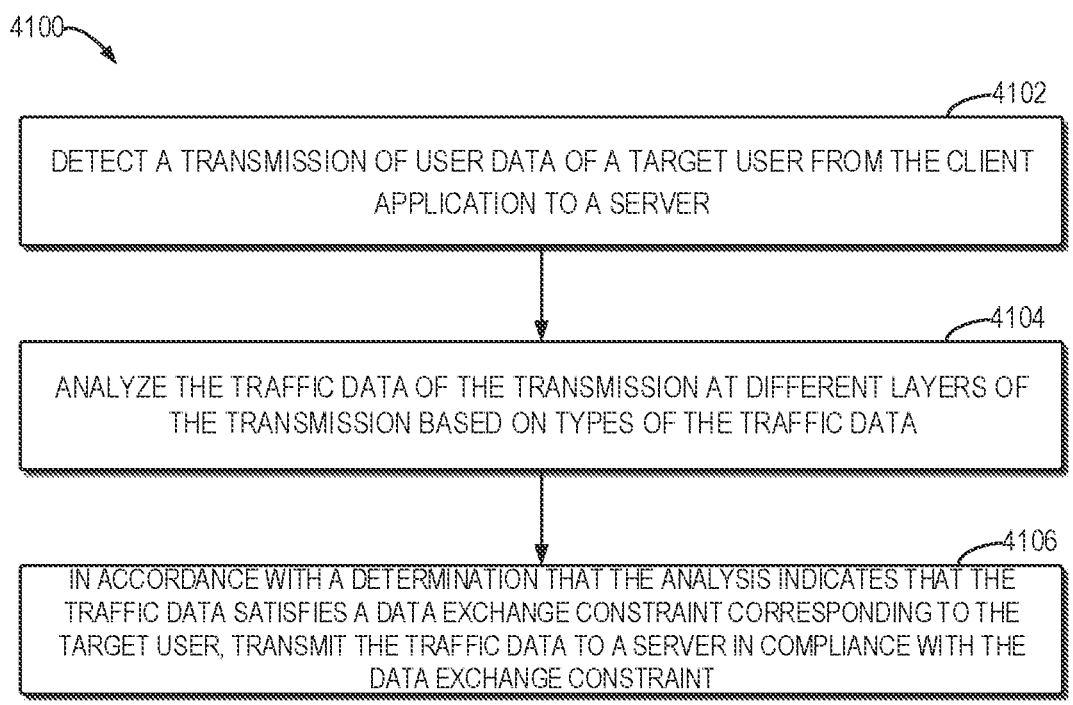
FIG. 4A shows a flowchart of a method of managing traffic data of a mobile end application according to some embodiments of the present disclosure.

FIG. 4A shows a flowchart of an example method 4100 for managing traffic data of a mobile application according to some embodiments of the present disclosure. The method 4100 may be implemented at the security sandbox sub-system 1090 of FIG. 1. The mobile application may be the target application 1080 on the mobile end.

At block 4102, a transmission of user data of a target user from the client application to a server is detected. In other words, if it is determined that a current user is the target user, then the security sandbox sub-system 1090 may detect transmission of user data of the target user.

In some implementations, traffic data may be routed to the security sandbox sub-system 1090 based on the determination of the target user, so that the security sandbox sub-system 1090 may detect and analyze traffic data corresponding to the transmission of the user data. The security sandbox sub-system 1090 may analyze a network request of the target application 1080 and limit a network request that does not meet a condition based on a data exchange constraint.

The data exchange constraint may comprise an exchange constraint about data sovereignty, e.g., data sovereignty protection rules. The data sovereignty protection rules may be determined according to regulations of various countries or regions. The data sovereignty protection rules may also be determined by operators of applications (e.g., related to user data use protocols).

The data sovereignty protection rules may be set based on a specific scenario. For example, the data sovereignty protection rules may specify that user data of a data sovereignty country is not allowed to be transmitted to any server outside the data sovereignty country. In other implementations, the data sovereignty protection rules may specify that private user data of a data sovereignty country is not allowed to be transmitted to any unregistered server.

The scope of the present disclosure is not limited in this regard.

As shown in FIG. 1, the network request of the target application 1080 is transmitted to the application firewall sub-system 1020 after being analyzed and processed by the security sandbox sub-system 1090. The principles and details of the security sandbox sub-system 1090 will be described in detail below.

The target user refers to a user for which the transmission of user data needs to be detected and managed. The target user may be a user with the nationality of a data sovereignty country. Alternatively, or in addition, the target user may also be a user determined according to specific rules of data sovereignty protection. For example, the target user may be a user who has the nationality of a data sovereignty country and is currently geographically located in the data sovereign country.

In some implementations, the target user may be determined based on user information. The user information may comprise user account information, personal information, registration information, etc. Alternatively, or in addition, the target user may be determined based on device information. The device information may comprise subscriber identity module (SIM) information, an IP address, network service provider information, system settings of a device, application settings, etc.

In some implementations, the target user may be determined based on combinations of a plurality of types of information. The plurality of types of information may have different priorities. For example, the priority of SIM information and network service provider information may be higher than that of IP address, system settings of a device, application settings, etc.

In some implementations, the determination of the target user may be based on a region where the target user is located. The region where the target user is located may be determined using the above user information or device information to determine the target user. For example, the region where the user is currently located may be determined using region setting in system setting of a smartphone, and thus it may be determined whether the current user is the target user. For another example, the region where the target user is located may be determined using country code in the SIM card, and thus the target user may be determined.

In some implementations, the target user may be determined when the application is initiated for the first time. In other words, whether the current user is the target user may be determined when the application is initiated for the first time. Alternatively, or in addition, it may be determined whether the current user is the target user during user registration. Alternatively, or in addition, it may be determined whether the current user is the target user when the user logs in to, logs out of, or switches an account.

In some implementations, a result of the determination may be stored locally or in a server. The result may be determined after the user is determined as the target user for the first time, and it may be set that the stored result is used within a threshold time period. Thus, when the user logs in later, the user does not need to be determined again.

At block 4104, the traffic data of the transmission is analyzed at different layers of the transmission based on types of the traffic data.

The traffic data in the target application 1080 may comprise a plurality of types of traffic data, such as traffic data of native, WebView and third-party software development kit (SDK) types. The traffic data of the native type is generated and processed by the operating system (for example, Android and IOS) code in the business layer. Traffic data of the native type may be completely controlled by the owner of the target application 1080.

The traffic data of the third-party SDK type is generated and processed by the third-party SDK. Usually, the third-party SDK may access the target application 1080 to realize the function of login or sharing. The traffic data of the third-party SDK type is generated and processed by third-party SDKs. It is to be understood that the traffic data of the third-party SDK type is usually not completely controlled by the owner of the application.

The traffic data of WebView type may comprise traffic data controlled by the owner of the application, e.g., traffic data generated by the built-in browser of the application by invoking the code of the native application. The traffic data of the WebView type may further comprise traffic data controlled by a third party, e.g., traffic data generated and controlled by third-party advertisers.

Based on the type of the traffic data, the security sandbox sub-system 1090 may adopt a respective analysis policy to better manage the transmission of user data in the application.

At block 4106, in accordance with a determination that the analysis indicates that the traffic data satisfies a data exchange constraint corresponding to the target user, the traffic data is transmitted to a server in compliance with the data exchange constraint. Different data exchange constraints may be set for different target users. For example, stricter data exchange constraints can be set for target users with higher sensitivity levels. The data exchange constraint may limit which user data may be transmitted to which servers. In some implementations, a data exchange constraint corresponding to the target user may be determined based on the user information of the target user or the corresponding device information.

In some implementations, the security sandbox sub-system 1090 may comprise a plurality of sub-modules for different types of traffic data, such as s sub-module for managing traffic data of native type, a sub-module for managing traffic data of WebView type and a sub-module for managing traffic data of third-party SDK type. These sub-modules may analyze crespective types of traffic data and restrict or intercept traffic data that does not meet the data exchange constraint. Details of the management of different types of traffic data will be described with reference to FIGS. 4B to 4E.

Figure 4B:
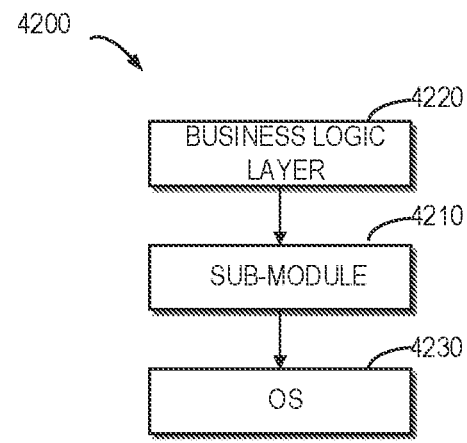
FIG. 4B shows a schematic view of an analysis and restriction process for traffic data of native type according to some embodiments of the present disclosure.

FIG. 4B shows a schematic view of an analysis and restriction process 4200 for traffic data of native type according to some embodiments of the present disclosure. FIG. 4B shows a sub-module 4210 for analyzing and restricting traffic data of native type. The sub-module 4210 is a part of the security sandbox sub-system 1090 and may also be a specific implementation of the security sandbox sub-system 1090.

As shown in FIG. 4B, a business logic layer 4220 issues a network request to an underlying OS 4230. The business logic layer 4220 may be a specific implementation of the application business logic 1100 shown in FIG. 1 in terms of transmission. The sub-module 4210 may be used as an interceptor to analyze and restrict the network request at the network layer. The sub-module 4210 may restrict the network request by analyzing endpoints, a parameter or schema of the network request. For example, it may determine whether to restrict the network request depending on whether the schema has been registered. Alternatively, or in addition, it may determine whether to restrict the network request depending on whether the requested field in the network request involves sensitive information.

In some implementations, the sub-module 4210 may comprise an interceptor for Android and an interceptor for IOS. In addition, the sub-module 4210 may also comprise an interceptor for C++. In this way, by analyzing and restricting the network request at the network layer, it may be better judged whether the network request is to be restricted, based on protocol information of the network request.

Figure 4C:
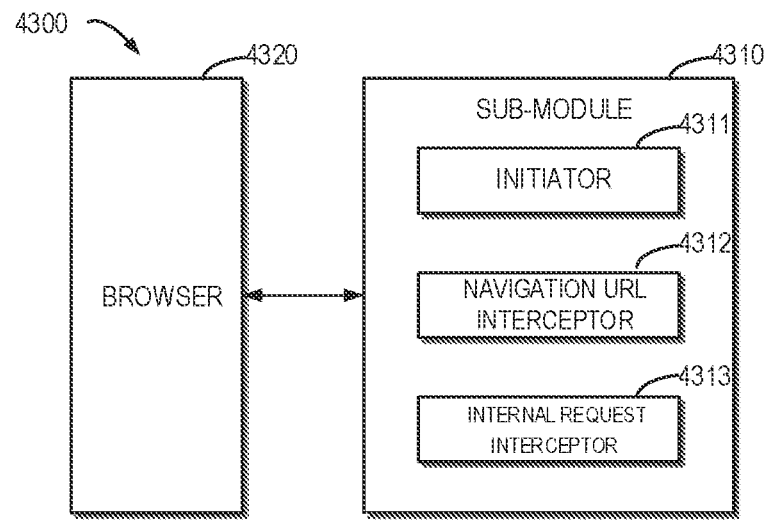
FIG. 4C shows a schematic view of an analysis and restriction process for traffic data of Webview type according to some embodiments of the present disclosure.

FIG. 4C shows a schematic view of an analysis and restriction process 4300 for traffic data of Webview type according to some embodiments of the present disclosure. FIG. 4C shows a sub-module 4310 for analyzing and restricting traffic data of the Webview type. The sub-module 4310 may be a part of the security sandbox sub-system 1090 and may also be a specific implementation of the security sandbox sub-system 1090.

The sub-module 4310 may transfer traffic data of the Webview type to a native network interface, so that the traffic data of the Webview type may be analyzed and restricted by the sub-module 4210 for traffic data of the native type. In some implementations, the sub-module 4310 may use a hook mechanism of JavaScript (JS) to transfer traffic data of the Webview type to the native network interface.

As shown in FIG. 4C, the sub-module 4310 may comprise a initiator 4311, a navigation URL interceptor 4312, and an internal request interceptor 4313. The sub-module 4310 may communicate with a built-in browser 4320 of the application, so that the traffic data of the Webview type may be managed and detected by the sub-module 4310. The initiator 4311 may perform JS injection when the built-in browser 4320 of the application is opened (created), so that the traffic data of the Webview type may be transferred to the native network interface using the hook mechanism. The traffic data transferred to the native network interface may be taken over by a native network module.

In some implementations, the traffic data may be transferred using the JS hook technique in the following way.

The navigation URL interceptor 4312 may analyze and restrict URL of a home page (initial page). For example, the navigation URL interceptor 4312 may determine whether to restrict the network request depending on whether the URL-based schema has been registered. If the network request is not restricted, then the browser 4320 may load the home page.

The internal request interceptor 4313 may transfer traffic data related to static and dynamic resources of the home page to the native network interface, so that these traffic data may be restricted and analyzed by the sub-module 4210 at the network layer. The specific analysis and restriction process is similar to the native type traffic data and is not detailed here.

In some implementations, the sub-module 4310 may adopt different analysis and restriction policies for Webview type traffic data controlled by the application's owner and Webview type traffic data controlled by a third party. For example, for Webview type traffic data controlled by a third party, it may only be determined using the navigation URL interceptor 4312 whether URL of the home page has been registered, without further analyzing static and dynamic resources of the home page.

Figure 4D:
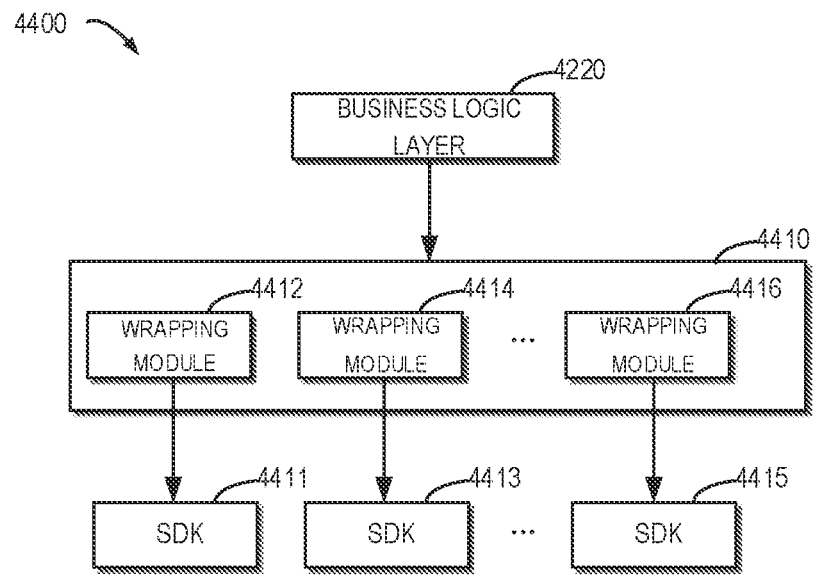
FIG. 4D shows a schematic view of an analysis and restriction process for traffic data of third-party SDK type according to some embodiments of the present disclosure.

FIG. 4D shows a schematic view of an analysis and restriction process 4400 for traffic data of third-party SDK type according to some embodiments of the present disclosure.

FIG. 4D shows a sub-module 4410 for analyzing and restricting traffic data of the third-party SDK type. The sub-module 4410 may be a part of the security sandbox sub-system 1090 and may also be a specific implementation of the security sandbox sub-system 1090.

The sub-module 4410 may analyze and restrict third-party SDK type traffic data at the application program interface (API) layer. The sub-module 4410 may restrict third-party SDK type traffic data by analyzing at the API layer whether data requested by API of the third-party SDK meets data exchange constraints.

In some implementations, the sub-module 4410 may wrap the API requesting user data in the third-party SDK, and add judgment logic based on data exchange constraints in the package. In other words, the sub-module 4410 may add judgment logic to the API of the third-party SDK to determine whether to wrap the API. Thus, the business logic layer 4220 does not directly invoke the API of the third-party SDK but invokes the wrapped API to which the judgment logic has been added.

As shown in FIG. 4D, the sub-module 4410 may comprise a wrapping module for each third-party SDK, such as a wrapping module 4412 for SDK 4411, a wrapping module 4414 for SDK 4413, and a wrapping module 4416 for SDK 4415. The wrapping module (e.g., wrapping module 4412) may wrap API in the corresponding SDK (e.g., SDK 4411) to generate a corresponding wrapped API. In some implementations, the sub-module 4410 may dynamically increase a wrapping module to wrap an API of a third-party SDK.

In some implementations, an API of a third-party SDK may be wrapped in the following way. The wrapping module 4412 may define an API which is exposed to the business layer and same as the API in the SDK 4411. The wrapping module 4412 may realize the API and define a package category of the data type of the SDK 4411.

The judgment logic may determine based on data exchange constraints whether the wrapped API of the third-party SDK may be invoked. In some implementations, the judgment logic may analyze whether the API of the third-party SDK may be invoked, based on a name of the SDK, a name of the API, a name of a parameter of the API and so on. If a result of the judgment is yes, then the API of the third-party SDK may be invoked, and a value is returned to the business layer. If the result of the judgment is no, then the API of the third-party SDK is not invoked, i.e., traffic data related to the API is restricted. It is to be understood that the judgment logic may change based on a specific scenario. For example, the judgment logic may set that private data of a user is not allowed to be sent to the third-party SDK.

In this way, through analysis and restriction at the API layer, the sub-module 4410 may manage and detect network the third-party SDK type traffic data without the need to know internal code of the third-party SDK.

Figure 4E:
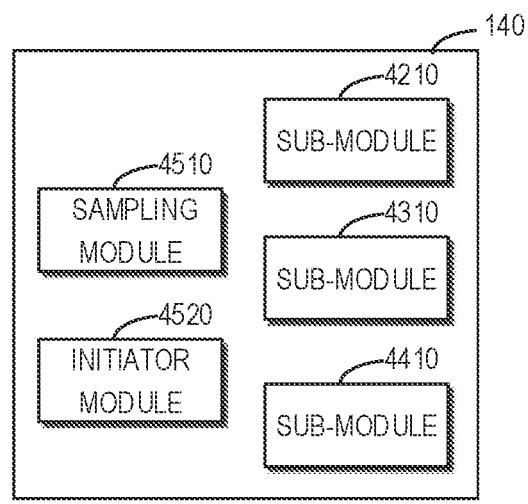
FIG. 4E shows a module diagram of a security sandbox sub-system according to some embodiments of the present disclosure.

FIG. 4E shows a block diagram of the security sandbox sub-system 1090 according to some embodiments of the present disclosure. As shown in FIG. 4E, the security sandbox sub-system 1090 comprises a initiator module 4520. The initiator module 4520 is configured to initiate a detection of a transmission of user data of a target user from the client application to a server. The initiator module 4520 may activate a management module to detect, manage, analyze and restrict traffic data corresponding to transmission of user data.

The management module is configured to analyze the traffic data of the transmission at different layers of the transmission based on types of the traffic data; and transmit the traffic data to a server in compliance with the data exchange constraint in accordance with a determination that the analysis indicates that the traffic data satisfies a data exchange constraint corresponding to the target user.

In some implementations, the management module may comprise a sub-module (also referred to as a first management module) 4210, a sub-module (also referred to as a second management module) 4310 and a sub-module (also referred to as a third management module) 4410. The sub-modules 4210, 4310 and 4410 may analyze and restrict traffic data of the client application.

In some implementations, the sub-module 4210 is configured to analyze the traffic data at the network layer in accordance with a determination that the traffic data is of a native type.

In some implementations, the sub-module 4310 is configured to transfer, on the basis that the type of the traffic data is Webview type, the traffic data of the Webview type to a network interface of the client application to be managed by a native network module of the client application; and analyze the transferred traffic data at the network layer.

In some implementations, transferring the traffic data of the Webview type to the network interface of the mobile application comprises: using a hook mechanism of JavaScript to transfer the traffic data of the Webview type.

In some implementations, the sub-module 4410 is configured to analyze, on the basis that the type of the traffic data is a third-party SDK type, the traffic data at the application program interface (API) layer.

In some implementations, analyzing the traffic data at the API layer comprises: determining to wrap an API by adding judgment logic based on the data exchange constraint to the API of the third-party SDK; and invoking the wrap API to use the judgment logic for analyzing the traffic data.

In some implementations, the initiator module 4520 may activate the sub-modules 4210, 4310 and 4410 based on the determination of the target user. For example, the initiator module 4520 may determine during user registration whether a current user is the target user. If a result of the determination is yes, then the initiator module 4520 may activate the sub-modules 4210, 4310 and 4410. For another example, the initiator module 4520 may obtain the result of user determination locally or from a server during user login, and determine based on the result of the determination whether to activate the sub-modules 4210, 4310 and 4410.

The security sandbox sub-system 1090 may further comprise a sampling module 4510 for sampling traffic data. In some implementations, the sampling module 4510 may send to the initiator module 4520 a sampling signal to trigger the initiator module 4520. The sampling signal may indicate a sampling rate at which traffic data is sampled.

The sampling module 4510 may sample the target user and different types of the traffic data based on data exchange constraints. For example, the sampling module 4510 may sample different types of the traffic data at different sampling rates. With the sampling module 4510, not only a portion of the traffic data may be analyzed, but also the overhead may be reduced and the application stability may be maintained.

It is to be understood that the security sandbox sub-system 1090 may further comprise other module or only comprise a part of modules shown in FIG. 4E. For example, when the target application 1080 is only a native application on the mobile end, the security sandbox sub-system 1090 may not comprise the sub-module 4310 for Webview type traffic data. The scope of the present disclosure is not limited in this regard.

In some implementations, based on the type of the traffic data, the traffic data may further be analyzed and restricted at the Socket layer. For example, the third-party SDK type traffic data may be forwarded at the Socket layer, so that the third-party SDK type network request may be directly analyzed. Alternatively, or in addition, the traffic data of the native type and the traffic data of the Webview type may be analyzed and restricted at the Socket layer.

In some implementations, a local server as a proxy may be built on the target application 1080. Network requests forwarded by the local server to external servers may be managed by forwarding network requests of the target application 1080 to the local server and analyzing and restricting traffic data at the local server. In this way, different types of the traffic data can be analyzed and restricted in consideration of protocol information to better manage traffic data of the application which will not be transmitted to unauthorized external servers.

Principles and details of the analysis and restriction of different types of the traffic data have been described in detail with reference to FIGS. 4B to 4E. It is to be understood that the above restriction rules, judgment logic and data exchange constraints are merely exemplary and not intended to limit the scope of the present disclosure. For example, different data sovereignty protection rules may be set according to laws and regulations of different countries. In addition, depending on the definition of a computer network layer, traffic data may be analyzed and restricted at layers close or similar to the above layers.

In addition, in the above description, the security sandbox sub-system 1090 may directly analyze and restrict traffic data in the target application 1080. In other words, only traffic data that is not restricted by the security sandbox sub-system 1090 can be transmitted. Alternatively, or in addition, the security sandbox sub-system 1090 may not directly restrict traffic data but only provide an analysis report. In this case, a copy of the network request can be sent to the security sandbox system 1090 while the network request is normally transmitted. The security sandbox system 1090 can analyze the copy of the network request and provide an analysis report.

In some implementations, regarding a plurality of data sovereignty countries, a plurality of security sandbox sub-systems 1090 may be set respectively to perform processing for each data sovereignty country, respectively. For example, based on a determination of a region where the target user is located, a corresponding security sandbox sub-system may be initiated to analyze and restrict traffic data, so that transmission of user data in the application conforms to data sovereignty protection rules of the corresponding country.

Recommendation Management Sub-System

As discussed above, the target application may provide users with various content recommendations through a recommendation mechanism, such as multimedia content recommendation, user recommendation, commodity recommendation, etc. In such applications, the fairness of recommendation policies has become the focus of management in many regions. For example, some applications may use recommendation mechanisms to guide users to pay attention to specific content that has nothing to do with user habits, and thus such recommendation mechanisms might not be compliant.

On one hand, common recommendation algorithms often rely on machine learning models for implementation. For example, the code-level verification performed by the security computing subsystem 1060 might be unable to effectively detect the fairness of recommendation algorithms. On the other hand, the training and update of recommendation models are often closely related to real user data, and people do not expect to expose users' private data during the inspection process, because this may lead to data compliance risks.

Figure 5:
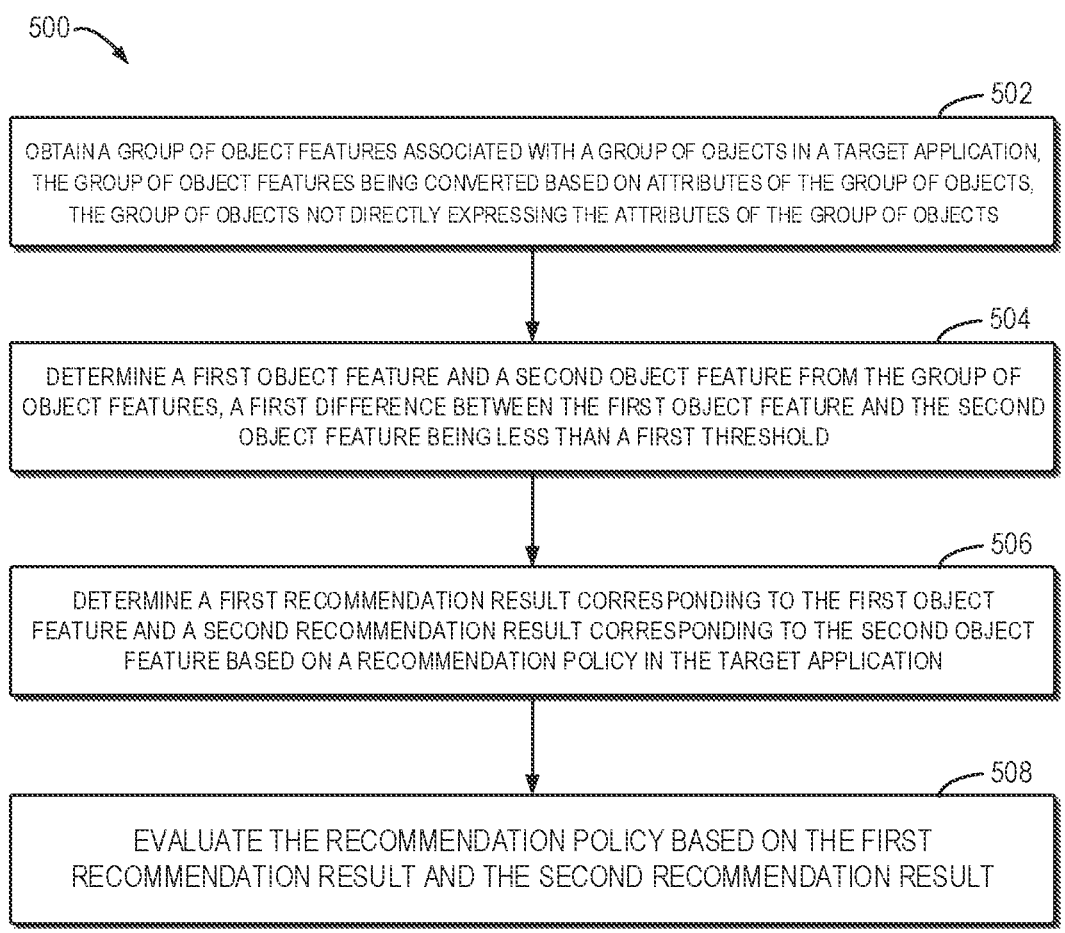
FIG. 5 shows a flowchart of an example process of managing a recommendation policy according to some embodiments of the present disclosure.

The embodiments of the present disclosure further propose a solution for managing a recommendation policy. FIG. 5 shows a flowchart of a process 500 for managing a recommendation policy. The process 500 may be performed by the recommendation management sub-system 1050, for example.

As shown in FIG. 5, at block 502, the recommendation management sub-system 1050 obtains a set of object features associated with a set of objects in the target application, wherein the set of object features are converted from attributes of the set of objects, which do not directly characterize the attributes of the set of objects.

In some embodiments, the recommendation management sub-system 1050 may obtain the set of object features via an application program interface API provided by the target application. In some embodiments, the recommendation management sub-system 1050 may obtain the set of object features associated with the set of objects in the target application 1080 from the target application platform 1030 via a dedicated API.

In some embodiments, the set of object features may be converted by a feature extraction model based on attributes of the set of objects. In this way, the management party recommending the policy or other third party cannot determine original attribute information of objects based on the object features. Therefore, the data security in the target application can be guaranteed.

At block 504, the recommendation management sub-system 1050 extracts a first object feature and a second object feature from the set of object features, wherein a first difference between the first object feature and the second object feature is less than a first threshold.

In some embodiments, the set of object features may be represented as a plurality of vectors. Further, the recommendation management sub-system 1050 may select at least one pair of object features whose difference is less than the first threshold from the set of object features based on differences between vectors.

At block 506, the recommendation management sub-system 1050 determines a first recommendation result corresponding to the first object feature and a second recommendation result corresponding to the second object feature based on a recommendation policy in the target application.

In some embodiments, the recommendation management sub-system 1050 may provide the first object feature to a recommendation model associated with the recommendation policy to determine the first recommendation result and may provide the second object feature to the recommendation model to determine the second recommendation result.

In some embodiments, to guarantee the security of a recommended policy, the recommendation management sub-system 1050 sends the selected first object feature and second object feature via the API provided by the target application to a recommendation model that operates remotely to determine the first recommendation result and the second recommendation result. As an example, the recommendation model may be operated by the maintainer of the target application.

In some embodiments, the process of generating the first recommendation result and the second recommendation result will not affect the recommendation model which is actually deployed in the target application.

In some embodiments, the first recommendation result and the second recommendation result may be represented as vectors output by the recommendation model. Thereby, the recommendation management sub-system 1050 cannot directly interpret the semantics of the first recommendation result and the second recommendation result, thereby further improving the security of the data in the target application.

At block 508, the recommendation management sub-system 1050 evaluates the recommendation policy based on the first recommendation result and the second recommendation result.

In some embodiments, the recommendation management sub-system 1050 may determine a second difference between the first recommendation result and the second recommendation result and determine the fairness of the recommendation policy based on the comparison between the second difference and a second threshold.

Specifically, for a reasonable recommendation policy, the recommendation results are supposed to be similar for two similar objects. Therefore, if the recommendation management sub-system 1050 determines that the second difference exceeds the second threshold, then it may determine that the recommendation policy has poor fairness.

Or the recommendation management sub-system 1050 may also determine the fairness of the recommendation policy based on a proportion of the object feature pairs whose second difference exceeds the second threshold. For example, the recommendation management sub-system 1050 may randomly sample the plurality of groups of object features, and if the proportion of the object feature pairs whose second difference exceeding the second threshold exceeds a threshold proportion, then it may determine that the recommendation policy has poor fairness.

In some embodiments, the recommendation management sub-system 1050 may further determine the fairness of the recommendation policy based on the correlation between object features input to the recommendation model and historical recommendation results. Specifically, the recommendation management sub-system 1050 may obtain a third object feature from the target application and a historical recommendation result for the third object feature. Further, the recommendation management sub-system 1050 determines the fairness of the recommendation policy based on the correlation between the third object feature and the historical recommendation result. For example, the recommendation management sub-system 1050 may determine whether the object feature matches category information of the historical recommendation result.

In some embodiments, the recommendation management sub-system 1050 may determine vector representations corresponding to the third object feature and the historical recommendation result and determine the correlation between the third object feature and the historical recommendation result based on a difference between the two vector representations. For example, if the vector difference between an object and its historical recommendation result is larger than a threshold, then the recommendation management sub-system 1050 may determine that the recommendation policy has poor fairness.

In some embodiments, as mentioned above, the security computing sub-system 1060 may further check source code associated with the recommendation policy. Specifically, the security computing sub-system 1060 may obtain source code corresponding to the recommendation policy and evaluate the recommendation policy based on the source code or intermediate code corresponding to the source code.

In some embodiments, the recommendation policy may be used to recommend at least one multimedia content to a user in the target application 1080, for example. Examples of the multimedia content may include: an image, video, music or combinations thereof, etc., for example.

Example Process and Device

Figure 6:
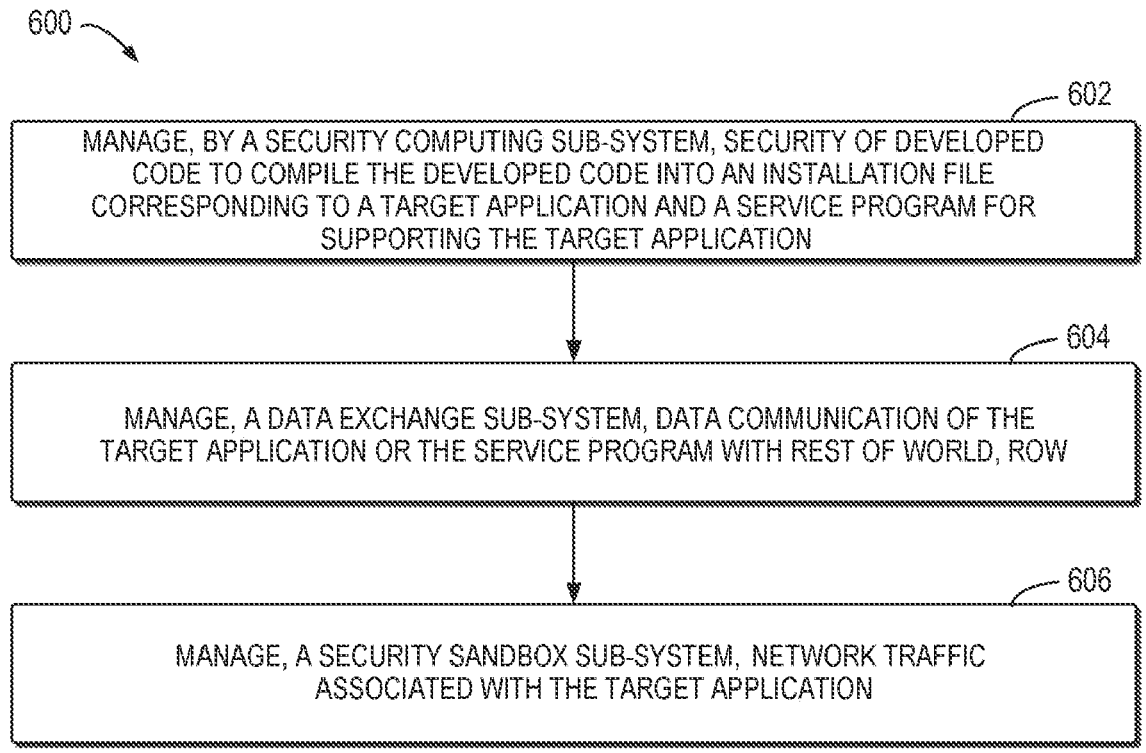
FIG. 6 shows a flowchart of an example process of data security management according to some embodiments of the present disclosure.

FIG. 6 shows a flowchart of an example process 600 of a data security management method according to some embodiments of the present disclosure. As shown in FIG. 6, at 602, a security computing sub-system manages security of developed code to compile the developed code into an installation file corresponding to a target application and a service program for supporting the target application. At 604, a data exchange sub-system manages data communication of the target application or service program with the RoW. At 606, a security sandbox sub-system manages traffic data associated with the target application.

Figure 7:
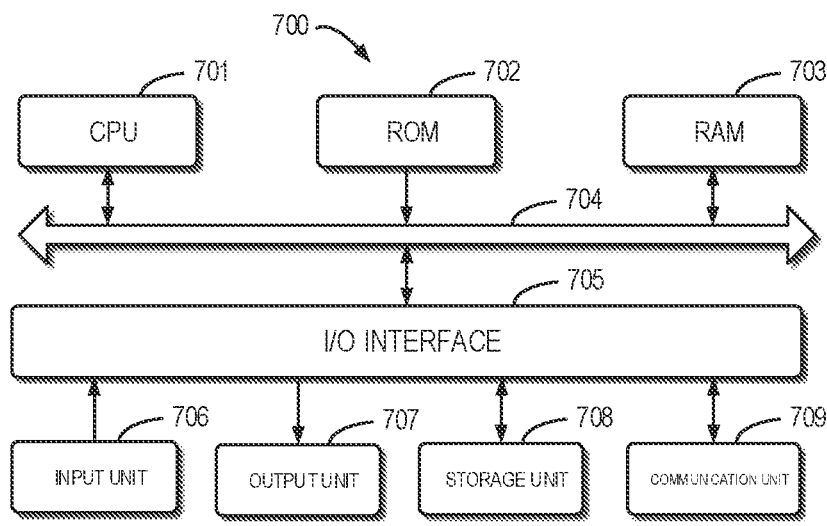
FIG. 7 shows a block diagram of an example device for implementing the embodiments of the present disclosure.

FIG. 7 shows a schematic block diagram of an example device 700 for implementing the embodiments of the present disclosure. For example, the system 100 and/or system 400 according to the embodiments of the present disclosure may be implemented by the device 700. As depicted, the device 700 comprises a central processing unit (CPU) 701, which can execute various suitable actions and processing based on the computer program instructions stored in a read-only memory (ROM) 702 or computer program instructions loaded in a random access memory (RAM) 703 from a storage unit 708. In the RAM 703, there are also stored various programs and data required by the operation of the device 700. The CPU 701, the ROM 702 and the RAM 703 are connected to one another via a bus 704. An input/output (I/O) interface 705 is also connected to the bus 704.

A plurality of components in the device 700 are connected to the I/O interface 705, including: an input unit 706 such as a keyboard, a mouse and the like; an output unit 707, such as various types of displays, a loudspeaker and the like; a storage unit 708, such as a disk, an optical disk and the like; and a communication unit 709, such as a network card, a modem, a wireless communication transceiver and the like. The communication unit 709 allows the device 700 to exchange information/data with other devices via the computer network, such as the Internet, and/or various telecommunication networks.

The above-described procedures and processes, such as the process 600, may be executed by the processing unit 701. For example, in some embodiments, the process 600 may be implemented as a computer software program, which is tangibly included in a machine readable medium, e.g. the storage unit 708. In some embodiments, the computer program may be partially or fully loaded and/or mounted to the device 700 via the ROM 702 and/or the communication unit 709. The computer program, when loaded to the RAM 703 and executed by the CPU 701, may execute one or more actions of the process 600 as described above.

The present disclosure may be method, apparatus, system, and/or computer program product. The computer program product may comprise a computer-readable storage medium on which the computer-readable program instructions for executing various aspects of the present disclosure are loaded.

The computer-readable storage medium can be a tangible device that can mantain and store instructions utilized by an instruction executing device. The computer-readable storage medium may be, for example, but not limited to, such as an electronic storage device, a magnetic storage device, an optical storage device, an electromagnetic storage device, a semiconductor storage device, or any suitable combination of the foregoing. More concrete examples of the computer-readable storage medium (non-exhaustive list) include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoding device such as punch-cards stored with instructions thereon or a projection in a slot, and any suitable combination of the above. The computer-readable storage medium, as used herein, is not to be interpreted as transient signals per se, such as radio waves or other freely propagated electromagnetic waves, electromagnetic waves propagated through a waveguide or other transmission media (e.g., optical pulses via fiber-optic cables), or electric signals transmitted through wires.

The computer-readable program instructions described herein can be downloaded from the computer-readable storage medium to each computing/processing device, or to an external computer or external storage device via a network, for example, the Internet, a local area network, a wide area network and/or a wireless network. The network may comprise copper transmitted cables, optical transmission fibers, wireless transmission, routers, firewalls, switches, network gate computers and/or edge servers. A network adapter card or network interface in each computing/processing device receives computer-readable program instructions from the network and forwards the computer-readable program instructions for storage in the computer-readable storage medium of each computing/processing device.

Computer-readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It is to be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded into a computer, other programmable data processing apparatuses, or other devices to cause a series of operational steps to be performed on the computer, other programmable apparatuses or other devices to produce a computer implemented process, such that the instructions which execute on the computer, other programmable apparatuses, or other devices implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The selection of terms used herein was chosen to best explain the principles of embodiments, the practical application or technical improvement over technologies found in the marketplace, or to enable others of ordinary skill in the art to understand embodiments disclosed herein.

We claim:

1. A system of data security protection, comprising:
   a security computing sub-system, configured to manage security of developed code to compile the developed code into an installation file corresponding to a target application and a service program for supporting the target application, and in response to determining that the developed code is secure, generate a signature corresponding to the installation file or the service program;
   a data exchange sub-system, configured to manage data communication of the target application or the service program with rest of World, RoW; and
   a security sandbox sub-system, configured to manage traffic data associated with the target application.

2. The system according to claim 1, wherein the security computing sub-system is further configured to:
   compile the developed code to generate intermediate code; and
   provide the intermediate code to a code scanning module managed by a trusted partner to determine security of the developed code.

3. The system according to claim 2, wherein the security computing sub-system is further configured to:
   obtain a third-party library associated with the developed code; and
   generate the intermediate code based on the developed code and the third-party library.

4. The system according to claim 1, wherein the security computing sub-system comprises:
   a deployment gateway, configured to provide the installation file to an application store or cause the service program to be deployed to a target application platform.

5. The system according to claim 1, wherein the target application or the service program communicates with the data exchange sub-system via a first platform, and the data exchange sub-system is further configured to:
   obtain original data to be exchanged between a first platform and a second platform;
   process the original data based on a type of the original data to obtain normalized data corresponding to the type; and
   determine a satisfaction as to a data exchange constraint from the normalized data.

6. The system according to claim 5, wherein the first platform is a target application platform under jurisdiction of a specific country or region, and the second platform is a target application platform under jurisdiction of another country or region.

7. The system according to claim 5, further comprising:
   in accordance with a determination that the normalized data satisfies the data exchange constraint, converting the normalized data into the original data; and
   performing an exchange of the original data between the first platform and the second platform.

8. The system according to claim 5, wherein processing the original data comprises:
   detecting a format of the original data, the type of the original data comprising a plurality of formats; and
   obtaining the normalized data by converting a format of the original data into a specified format of the plurality of data formats through format conversion.

9. The system according to claim 5, wherein a plurality of data channels corresponding to a plurality of types of original data are created between the first platform and the second platform, and processing the original data comprises:
  selecting, based on the type of the original data, a data channel corresponding to the type from the plurality of data channels; and
  providing the original data to the selected data channel for processing.

10. The system according to claim 1, wherein the target application is a client application, and the security sandbox sub-system is further configured to:
  detect a transmission of user data of a target user from the client application to a server;
  analyze traffic data of the transmission at different layers of the transmission based on types of the traffic data; and
  in accordance with a determination that the analysis indicates that the traffic data satisfies a data exchange constraint corresponding to the target user, transmit the traffic data to a server in compliance with the data exchange constraint.

11. The system according to claim 10, wherein the types of the traffic data comprise at least one of:
  a native type of traffic data associated with a native application;
  a Webview type of traffic data associated with an application built-in application; and
  a third-party software development kit, SDK, type of traffic data associated with third-party SDK.

12. The system according to claim 10, wherein analyzing the traffic data at different layers of the transmission comprises:
  in accordance with a determination that the traffic data is of a native type, analyzing the traffic data at a network layer.

13. The system according to claim 10, wherein analyzing the traffic data at different layers of the transmission comprises:
  in accordance with a determination that the traffic data is of a WebView type, transferring the WebView type of traffic data to a network interface of the client application in order to be managed by a native network module of the client application; and
  analyzing the transferred traffic data at a network layer.

14. The system according to claim 10, wherein analyzing the traffic data at different layers of the transmission comprises:
  in accordance with a determination that the traffic data is of a third-party SDK type, analyzing the traffic data at an application program interface, API, layer.

15. The system according to claim 1, further comprising a recommendation reviewing sub-system configured to:
  obtain a set of object features associated with a set of objects in the target application, wherein the set of object features are converted from attributes of the set of objects, which do not directly characterize the attributes of the set of objects;
  determine a first object feature and a second object feature from the set of object features, a first difference between the first object feature and the second object feature being less than a first threshold;
  determine, based on a recommendation policy in the target application, a first recommendation result corresponding to the first object feature and a second recommendation result corresponding to the second object feature; and
  evaluate the recommendation policy based on the first recommendation result and the second recommendation result.

16. The system according to claim 15, wherein the recommendation reviewing sub-system is further configured to:
  obtain the set of object features via an application program interface, API, provided by the target application.

17. A method of data security protection, comprising:
  managing, by a security computing sub-system, security of developed code to compile the developed code into an installation file corresponding to a target application and a service program for supporting the target application, and in response to determining that the developed code is secure, generate a signature corresponding to the installation file or the service program;
  managing, by a data exchange sub-system, data communication of the target application or service program with rest of World, RoW; and
  managing, by a security sandbox sub-system, traffic data associated with the target application.

18. An electronic device, comprising:
  a memory and a processor;
  wherein the memory is used to store one or more computer instructions, wherein the one or more computer instructions are executed by the processor to implement a method according to claim 17.

19. A computer-readable storage medium, with one or more computer instructions stored thereon, wherein the one or more computer instructions are executed by a processor to implement a method according to claim 17.

20. A computer program product, comprising one or more computer instructions, wherein the one or more computer instructions are executed by a processor to implement a method according to claim 17.

* * * * *